US009027085B2

(12) United States Patent
Kula

(10) Patent No.: US 9,027,085 B2
(45) Date of Patent: May 5, 2015

(54) METHOD, SYSTEM AND PROGRAM PRODUCT FOR SECURE AUTHENTICATION

(71) Applicant: John Scott Kula, Sinking Spring, PA (US)

(72) Inventor: John Scott Kula, Sinking Spring, PA (US)

(*) Notice: Subject to any disclaimer, the term of this patent is extended or adjusted under 35 U.S.C. 154(b) by 192 days.

(21) Appl. No.: 13/726,094

(22) Filed: Dec. 22, 2012

(65) Prior Publication Data

US 2014/0181911 A1 Jun. 26, 2014

(51) Int. Cl.
| | |
|---|---|
| H04L 29/06 | (2006.01) |
| H04L 9/32 | (2006.01) |
| H04W 12/06 | (2009.01) |
| G06Q 99/00 | (2006.01) |
| G06F 17/30 | (2006.01) |

(52) U.S. Cl.
CPC .......... *H04L 63/0823* (2013.01); *H04L 9/3228* (2013.01); *H04L 9/3215* (2013.01); *G06Q 99/00* (2013.01); *G06F 17/30879* (2013.01); *H04L 63/067* (2013.01); *H04L 63/0853* (2013.01); *H04W 12/06* (2013.01)

(58) Field of Classification Search
CPC ............ H04L 63/0823; H04L 63/0848; H04L 63/0853; H04L 9/3215; H04L 9/3228
See application file for complete search history.

(56) References Cited

U.S. PATENT DOCUMENTS

| | | | | |
|---|---|---|---|---|
| 8,261,089 B2 * | 9/2012 | Leon Cobos et al. | ......... | 713/185 |
| 2006/0194592 A1 * | 8/2006 | Clough | ...................... | 455/456.3 |
| 2007/0136202 A1 * | 6/2007 | Noma et al. | ..................... | 705/51 |
| 2009/0031373 A1 * | 1/2009 | Hogyoku | ....................... | 725/104 |
| 2009/0206157 A1 * | 8/2009 | Heffez et al. | ................. | 235/382 |
| 2009/0288159 A1 * | 11/2009 | Husemann et al. | ............. | 726/16 |
| 2010/0024017 A1 * | 1/2010 | Ashfield et al. | .................... | 726/7 |
| 2013/0185210 A1 * | 7/2013 | Dodson et al. | .................. | 705/44 |
| 2013/0219479 A1 * | 8/2013 | DeSoto et al. | .................... | 726/6 |

OTHER PUBLICATIONS

Simon et al. "RFC 5216—The EAP-TLS Authentication Protocol", Mar. 2008, 34 Pages.*
Tierks et al. "RFC 5246—The Transportation Layer Security (TLS) Protocol Version 1.2", Aug. 2008, 104 Pages.*
G. Starnberger, L. Froihofer, and K. M. Goeschka, "QR-TAN:Secure mobile transaction authentication," in Proc. ARES'2009. IEEE Computer Society, 2009, pp. 578-583.*

* cited by examiner

*Primary Examiner* — Matthew Henning
(74) *Attorney, Agent, or Firm* — Ariel S. Bentolila; Bay Area IP Group LLC

(57) ABSTRACT

A method, system and program product comprises establishing a communication with a computing system using a first device for communicating with the computing system over a first communication channel. The computing system is in communication with a second device configured for communicating with the computing system over a second communication channel separate from the first communication channel. The first device is paired with the computer system in which the first device and the computer system are mutually authenticated. A code presented by the second device is captured using the first device. The code is communicated to the computing system over the first communication channel in which the computer system uses the code in authorizing the second device to perform a function. The computer system communicates an authorization to the second device using the second communication channel.

19 Claims, 17 Drawing Sheets

METHOD, SYSTEM AND PROGRAM PRODUCT FOR SECURE AUTHENTICATION

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to communication systems. More particularly, one or more embodiments of the invention relate to secure authentication and transaction signing.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Traditional passwords and PINs may be implemented for account access, and as a result of the rapid growth of the Internet over the past twenty years users may need to support a multiplicity of account access information. End-users may be asked to utilize unique and sufficiently complex passwords for the various associated web sites.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
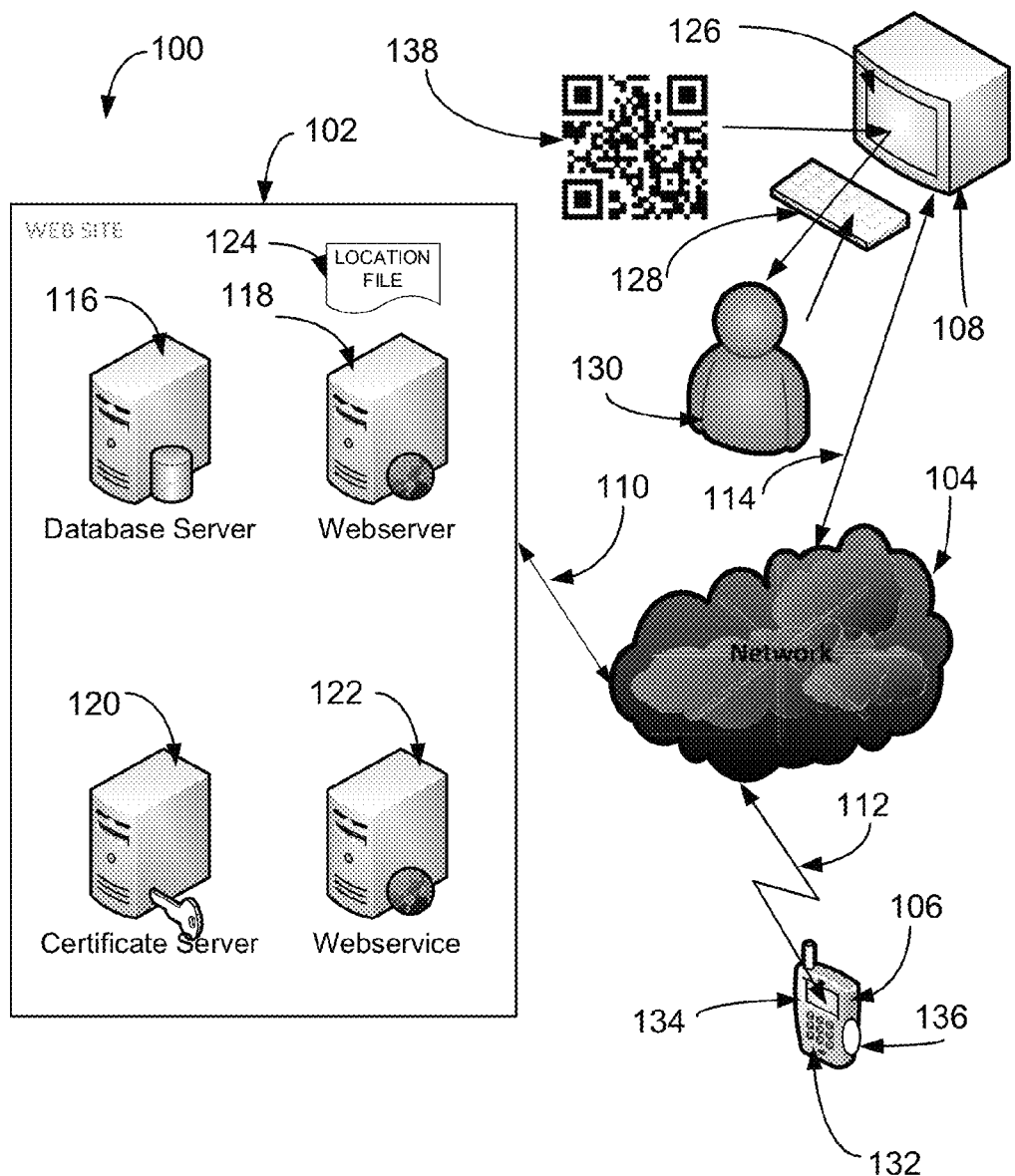
FIG. 1 is a block diagram of an example communication system, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

A communication system will be described which provides means and method for performing secure authentication and transaction signing. System replaces passwords with a visual code. Visual code includes information for performing secure operations. Image of visual code may be captured for scanning and decoding. Initially a user pairs an associated device with a website via a web-service to be associated with an account on the website, and for visits following the initial visit, user accesses web-services by scanning visual code and selecting to access account. In some embodiments with only one account, the selecting is not necessary. System includes a device with applications for capturing and decoding an image of visual code. Non-limiting examples for device include smartphone, cellular phone and personal computer. Device communicates bi-directionally with other devices via a global communication network. Device provides capability for receiving information from a user. Non-limiting examples of components for receiving information from a user include touch screen, keyboard, buttons and stylus. Web-service provides software for processing and communicating with device. Web-service provides capability for validating identity. Non-limiting examples for identity validation include commercial Public Key Infrastructure (PKI) providers. Web-service provides capability to perform certificate authority. Non-limiting examples for performing certificate authority include issuing and validating client certificates. In some embodiments certificates may not be used and userid/password may be used instead. Web-service provides capability to validate a user based upon a set of information. Non-limiting examples of information include prior user identification/password and account number to validate ownership of the account by user of the device. Website provides capability to perform redirection to secure operational areas upon validation of user. Website provides capability to present a visual code such that device may capture, scan and decode. For transaction verification, website performs redirection for validating a transaction and for presenting a visual code to be captured by the device for authorization by web-service. System provides capability to perform processing based upon a user's geo-location.

The communication system will now be described in detail with reference to FIGS. 1-9.

FIG. 1 is a block diagram of an example communication system, in accordance with an embodiment of the present invention.

A communication system 100 includes a website 102, a global communication network 104, a device 106 and a computing device 108. As a non-limiting example, global communication network 104 may be configured as the Internet. Non-limiting examples for device 106 include cellular telephones, smartphones and tablet computing devices. Non-limiting examples for computing device 108 include laptop computer, netbook computer, notebook computer and personal computer.

As a non-limiting example, communication system 100 provides capability for communicating, storing and processing information.

Global communication network 104 communicates bi-directionally with website 102 via a communication channel 110 with device 106 via a communication channel 112 and with computing device 108 via a communication channel 114. As a non-limiting example, communication channel 112 may be configured as wireless communication channel.

Website 102 provides capability for operating a website associated with transmitting, receiving, processing and storing information. Global communication network 104 provides capability for communicating, storing and processing information. Device 106 provides capability for receiving, transmitting, storing, processing and presenting information. Furthermore, as non-limiting example, device 106 provides capability for executing instructional codes (e.g. CPU), capturing images (e.g. camera), presenting information for viewing (e.g. LCD, LED, etc.), receiving input (e.g. touch screen keyboard, buttons, stylus, etc.), communicating bi-directionally (e.g. Internet, VPN, cell, radio, hardwired, etc., performing geo-location processing and execute visual password applications. Computing device 108 provides capability for receiving, transmitting, storing, processing and presenting information.

Website 102 includes a database server 116, a web-server 118, a certificate server 120 and a web-service 122. In some embodiments using userid/password, the certificate server may not be needed.

Database server 116 provides capability for receiving, storing and retrieving information. Web-server 118 provides public and private sections associated with website 102 and instructional code for login or registration page allowing for redirection to a secure portion associated with website 102 as authorized by web-service 122. Certificate server 120 provides private certificate authority for issuing and validating client certificates. Web-service 122 provides interfaces associated with the account database hosting website 102, communicate to the website/application servers hosting website 102 and software for tracking issued client certificates, mapping accounts and providing access to additional end-user information for verifying account ownership. Web-service 122 provides an interface for device 106. Web-service 122 provides functionality including, but not limited to, accepting a nonce passed in the visual code, accepting the client certificate, requesting new certificates, requesting device 106 provide end-user information for verification of account ownership, mapping certificates to account, requesting geo-location data and enforcing applicable rules, passing transaction data, receiving user authorization/rejection of transactions, issuing authorizations to website, etc.

Web-server 118 includes a location file 124. Location file 124 contains information associated with the location of the system's website interface. In some embodiments, location file 124 may be signed to mitigate tampering. The signature may be validated in conjunction with device 106.

Computing device 108 includes a Graphical User Interface (GUI) 126 and an input device 128. GUI 126 presents information for viewing by a user 130. In some embodiments, GUI 126 may receive information (e.g. touch-screen). Input device 128 may receive input from user 130. Non-limiting examples for input device 128 include keyboard, touchpad, pointing device and mouse.

Device 106 includes an input device 132, a GUI 134 and a camera 136. Input device 132 receives input from user 130. Non-limiting examples for input device 132 include keyboard, touchpad, voice and pointing device. GUI 134 presents information for viewing to user 130. Camera 136 captures, stores and communicates images.

Computing device 108 may present an image of a symbol 138 via GUI 126. Symbol 138 may be encoded and as a non-limiting example may represent information associated with a Uniform Resource Locator (URL) and a transaction identifier. Symbol 138, or nonce, may be considered a transaction identifier for transaction authentication, and a session identifier for login.

Device 106 may operate to capture the image of symbol 138 via camera 136. Furthermore, device 106 may communicate and process information associated with symbol 138.

To perform the pairing process between device 106 and website 102, user 130 selects an application associated with device 106 and configures the application for pairing mode via menu selection. User 130 provides to the application executing on device 106 an associated address for the website (e.g. website 102) seeking to perform pair processing with device 106. Application navigates to the website via an available communication method associated with device 106. The Secure Socket layer (SSL) certificate is validated by website 102. If a SSL certificate is not presented, device 106 may notify user 130 via GUI 134 that the identity of the website could not be confirmed and the user may be prompted to continue or exit. For invalidation, the application presents information to user 130 via GUI 134 associated with the invalidation and terminates execution. Following validation, the application retrieves or attempts to retrieve a file containing information associated with the location of web-service 122 from website 102. In some alternate embodiments this data may be passed via multiple mechanisms including an API, information within a DNS record (such as, but not limited to, a SRV or TXT record). If the file is not able to be retrieved, the application presents information related to the invalidation via GUI 134 and terminates execution. The application then navigates to web-service 122 via available communication capabilities associated with device 106. Validation is performed for the SSL certificate associated with web-service 122. For invalidation, application presents information related to the invalidation via GUI 134 and terminates execution. For validation, the application presents information associated with the SSL certificate in order to assure user 130 is performing pairing with the correct website. Application presents user 130 with choice for pairing device 106 with website 102 or for not performing pairing. If user 130 selects to not perform pairing, application exits pairing configuration and terminates execution. Web-service 122, if needed, may request application provide geo-location information. For embodiments needing geo-location capability and for device 106 not supporting geo-location or refusing to provide geo-location information, web-service 122 may terminate the connection. Furthermore, application may present a warning message via device 106 and may terminate the process. For continuation of the pairing process, web-service 122 requests a certificate from certificate server 120 and communicates the certificate information to device 106. Application accepts the client certificate information and stores the certificate via device 106. After competing the foregoing, device 106 is paired with website 102.

Following device pairing as described above, client certificate pairing associated with a website account may be performed. Account pairing may be performed following device pairing for a seamless user experience.

For a first login following device pairing, web-service 122 may request additional information to be supplied by device 106. Non-limiting examples of additional information include whether user seeks to create a new account or provide information associated with an existing account. Non-limiting example of information associated with an existing account include Personal Identification Number (PIN), out-of-band telephone call, answers to questions and current user identification and password. As a non-limiting example PIN may be physically mailed.

For an existing account and following verification of a user, web-service 122 associates the client certificate with a respective account and stores this information in database server 116. As a non-limiting example, information stored may be in the form of a link. Web-service 122 may also transmit alias account name information to device 106 to be stored with certification information. Following performance of the foregoing authentication may be considered as complete. On subsequent accesses, the foregoing authentication process may be skipped.

For a new account creation, user may be requested to enter an account identifier via device 106. Furthermore, account creation may be performed via website 102 by redirection of user to a setup page after first login by scanning symbol 138 by device 106. In some embodiments, basic user information may be stored within device 106. Upon connection user 130 would be prompted on device 106 to create a new account. The user may then agree to share the information and the account creation would occur via the channel between the device 106 an web-service 122.

Following verification of an existing account or creation of a new account as described previously, the account may be considered as paired with device 106.

For accessing an account, user 130, via a browser on device 108, navigates to a respective website. User 130 establishes a session with the website using the browser. The website presents a unique visual code. As a non-limiting visual code may include a URL to web-service 122 and a cryptographically created nonce. A nonce is an arbitrary number used one time to sign a cryptographic communication. A non-limiting example of a nonce is: https://www.domain.com/service?35515cc736f5e96553f40bd79583b387. The nonce may perform as a session identifier and may be unique per page load. Using device 106, user 130 then scans the visual code presented via website. Then, device 106 establishes a SSL session with web-service 122 via communication via the information encoded in visual code. As a non-limiting example, encode information may be a URL. Then the application, on device 106, navigates to web-service 122 via an available communication capability associated with device 106. Application performs validation for the SSL certificate. For an invalidated SSL, application presents a message associated with the invalidation via device 106 and terminates execution of the process. For a validated SSL, device 106 authenticates with the web-service the client certificate issued during the device pairing phase. The client certificate is tied to device 106, on the backend of 102. The certificate may be tied to multiple accounts. User 130 may be presented with a multiplicity of accounts to select from. Furthermore, accounts may be identified via aliases. Device 106 and web-service 122 communicate for authentication and account selection. If a client certificate is not found, then application presents a warning message via device 106. As a non-limiting example, warning message may indicate pairing has not been performed with the website. As another non-limiting example, the message may indicate potential compromise of user credentials. Furthermore, for a client certificate not found application terminates process. For embodiments performing geo-location, web-service 122 may determine if user 130 is located in an un-allowed area. For a determination of location in an un-allowed area, operation is redirected to a web page explaining the issue and the connection to device 106 is terminated. If geo-location information is needed and not returned, a warning is presented for viewing. Furthermore, for geo-location information needed and not returned, connection to device 106 may be terminated for some embodiments or may not be terminated for other embodiments. Following validation, verification is performed for client certificate associated with user 130. If not valid, application presents a warning message via device 106 indicating account is invalid and terminates process. For continuation of login, web-service 122 use the nonce generated previously and received from device 106 to match the authentication to the web session associated with the website and redirects the user's browser to the private or secure portion of the website. Following the foregoing, the authentication process is completed.

For transaction signing, following client entering a transaction, website 102 presents a visual code. As a non-limiting example, code includes a URL associated with web-service 122 and a cryptographically created nonce. A non-limiting example of a nonce is https://www.domain.com/transaction?35515cc736f5e96553f40bd79583b387. Furthermore, the nonce is unique per transaction. Using device 106, user 130 scans visual code being presented via website 102. Device 106 establishes SSL session with web-service 122. As a non-limiting example, session may be connected via URL encoded in visual code. The nonce in the url is used to link not only the session but the transaction on that web page. Application navigates to web-service 122 using communication capabilities associated with device 106. Validation is performed for SSL certificate associated with web-service 122. For invalidation, application presents a warning message associated with invalidation via device 106 and terminates process. For validation, device 106 authenticates client certificate for web-service 122. If client certificate is not found, the application presents a warning message. As a non-limiting example, the warning message may indicate device 106 associated with user 130 is not paired to the website or an attempt using invalid user credentials has been attempted. Furthermore, if client certificate is not found, process may be terminated. For embodiments using geo-location processing, geo-location information received from device 106 is processed by web-service 122 for being located in an un-allowed area. If located in an un-allowed area, user's web page is redirected to a web page explaining the issue and the connection to device 106 may terminated. If geo-location information is not returned when requested, a warning message may be presented related to not receiving geo-location information. Furthermore, for non-receipt of geo-location information, connection to device 106 may be terminated for some embodiments or may not be terminated for other embodiments. For continued transaction signing, user 130 client certificate, once validated, is retrieved from database server 116 in order to determine the account associated with user 130. Web-service 122 transmits details associated with the transaction to device 106 for presentation. User 130 is presented details associated with the transaction and may select further action. Non-limiting examples for further action include accepting or rejecting transaction via device 106. Furthermore, action selected by user 130 may be communicated from device 106 to web-service 122. Web-service 122 uses the nonce received from device 106 for matching the web session for website 102 associated with user 130 and redirect the browser. As a non-limiting example, browser may be redirected to a transaction completion or rejection presentation based upon whether user selected to accept or reject the transaction previously. Following the foregoing, the transaction signing process is complete.

In some embodiments, a reverse proxy may be used as an intermediary between device 106, device 108 and website 102. The reverse proxy server reconfigures the Hyper Text Markup Language (HTML) code on the login pages and inserts the unique visual code. The reverse proxy server then intercept requests destined for the web-service and after validating the end-user's certificate the reverse proxy server accesses the web site on behalf of the user by using a conventional user identification and password. This process eliminates the need for web sites to modify code in order for clients to use the system. It should be noted that in this configuration the reverse proxy receives a Quick Response Code (QR Code), perform the validation and then communicate a standard set of credentials for compatibility. The reverse proxy would only have to insert the QR codes and send location file 124 as device 122, 116 and 120 don't involve altering the web site. In this mode the end-user avoids susceptibility to key loggers, phishing, etc.

In other embodiments, the visual code may be replaced by an auditory sound that is captured by a microphone associated with device 106, a radio frequency signal (Bluetooth, or other) captured by a receiver associated with device 106, or infrared light captured by an infrared receiver associated with device 106.

In other embodiments accounts associated with a website may be paired to a unique certificate.

In other embodiments a web browser plug-in may be used to generate the visual codes. The plug-in may then communicate with a certificate server used by the device in order to perform certifications. Upon validation the browser plug-in transmits the standard credentials on behalf of the end-user. In this embodiment a centralized server is utilized to perform the certificate validation which communicates an authorization signal back to the browser when the certificates are validated.

In other embodiments, certificates on the client side may be replaced with a password in order to eliminate the need for the web site to communicate client certificates and eliminate the certificate server. The system may then rotate passwords with some given frequency in order to reduce the chance of a password being brute force compromised. Additionally one-time passwords may be used. This configuration is backward compatible with the web site's authentication system. In addition the device may present the current password to the user, allowing the user to login directly to the web site using a conventional user identification and password. Furthermore, this configuration may be beneficial if the user is unable to acquire Internet access via the device (e.g. bad cell signal, no internet available in location, etc.)

In other embodiments, the user's certificates are "wrapped" with a master certificate that the user revokes remotely. This may be used if the device is stolen as the user may remove their certificates to sites with one action, rather than contacting each site and revoking each certificate individually.

FIG. 1 is a block diagram of an example communication system where pairing between device and website may be performed, where pairing between device and account may be performed, where account may be accessed and transaction may be signed.

Figure 2:
FIG. 2 is an example symbol presentation as described with reference to FIG. 1, in accordance with an embodiment of the present invention.

FIG. 2 is an example symbol presentation as described with reference to FIG. 1, in accordance with an embodiment of the present invention.

Symbol 138 encodes information. Non-limiting examples for information encoded by symbol 138 include URL, numeric and alphanumeric. Symbol 138 may include version information, format information, data, error correction keys, positioning information, alignment information, timing information and quite zones.

Symbol 138 includes encoded information for an authentication destination with information encoded noted as "vpass.bank.com" and includes cryptographic nonce information noted as "28c8edde3d61a0411511d3b1866f0636". Furthermore, information encoded via symbol 138 includes information delimited via carriage returns.

FIG. 2 is an example symbol presentation as described with reference to FIG. 1 where information may be encoded and presented for viewing, scanning, etc.

Figure 3:
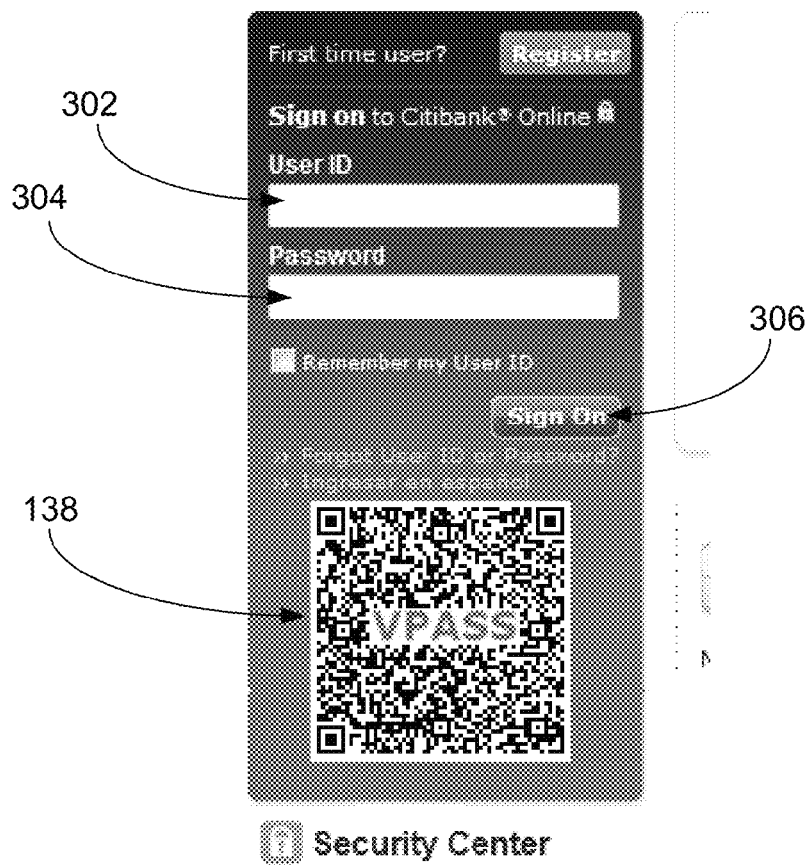
FIG. 3 is an example access presentation, in accordance with an embodiment of the present invention.

FIG. 3 is an example access presentation, in accordance with an embodiment of the present invention.

A presentation 300 includes symbol 138, a user identification reception 302, a password reception 304 and an entry selection 306.

User identification reception 302 receives information associated with a user's identification. Password reception 304 receives information associated with a user's password. Entry selection 306 initiates communication of information when selected.

In operation, user scans symbol 138 to login. Other users without a paired device 106, enter user identification information in user identification reception 302, enter password information in password reception 304, and select entry selection 306 to initiate communication of entered information.

FIG. 3 is an example access presentation, in accordance with an embodiment of the present invention.

Figure 4A:
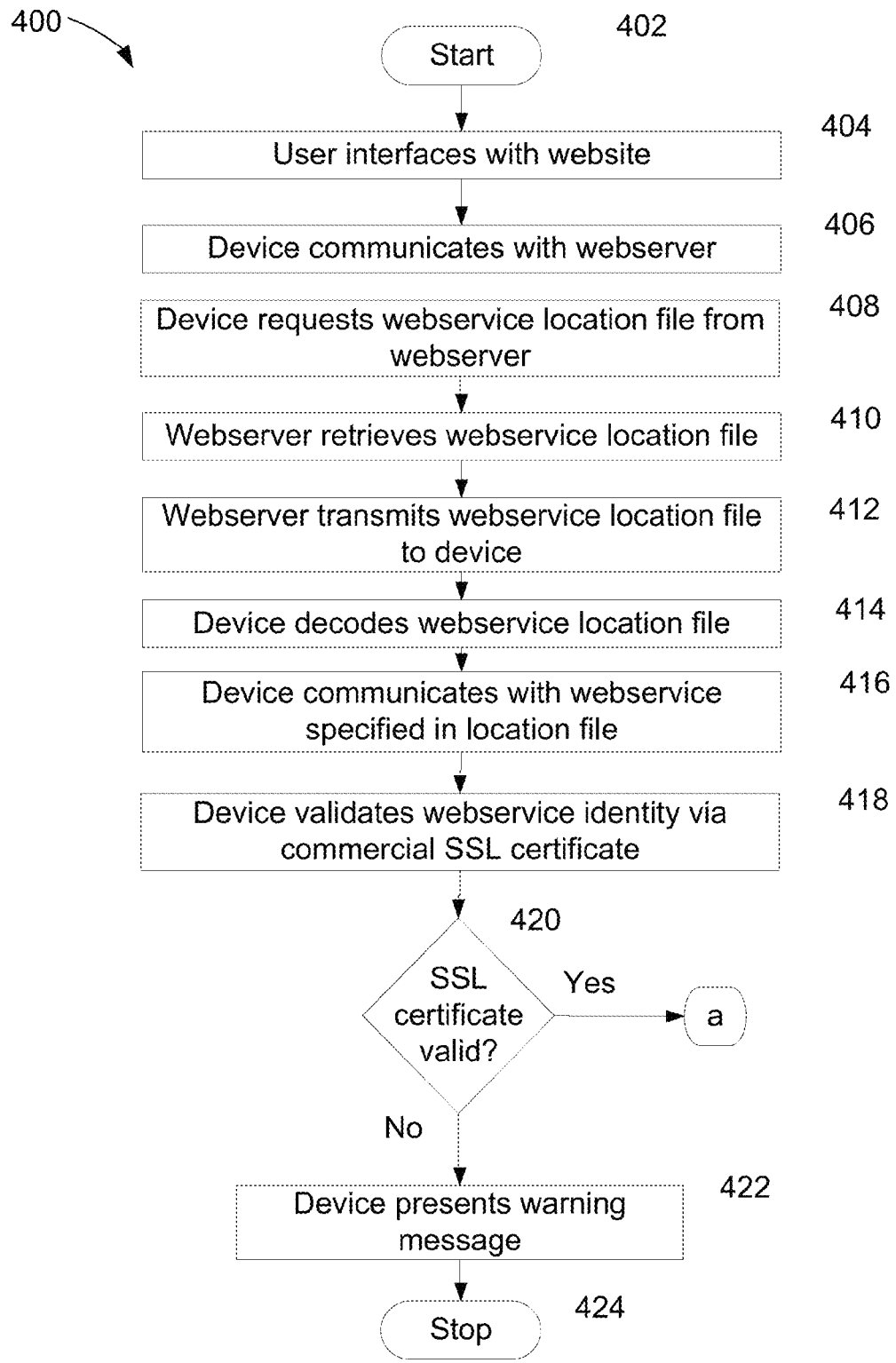
FIGS. 4A-C illustrate an example method for device pairing as described with reference to FIG. 1, in accordance with an embodiment of the present invention.
Figure 4B:
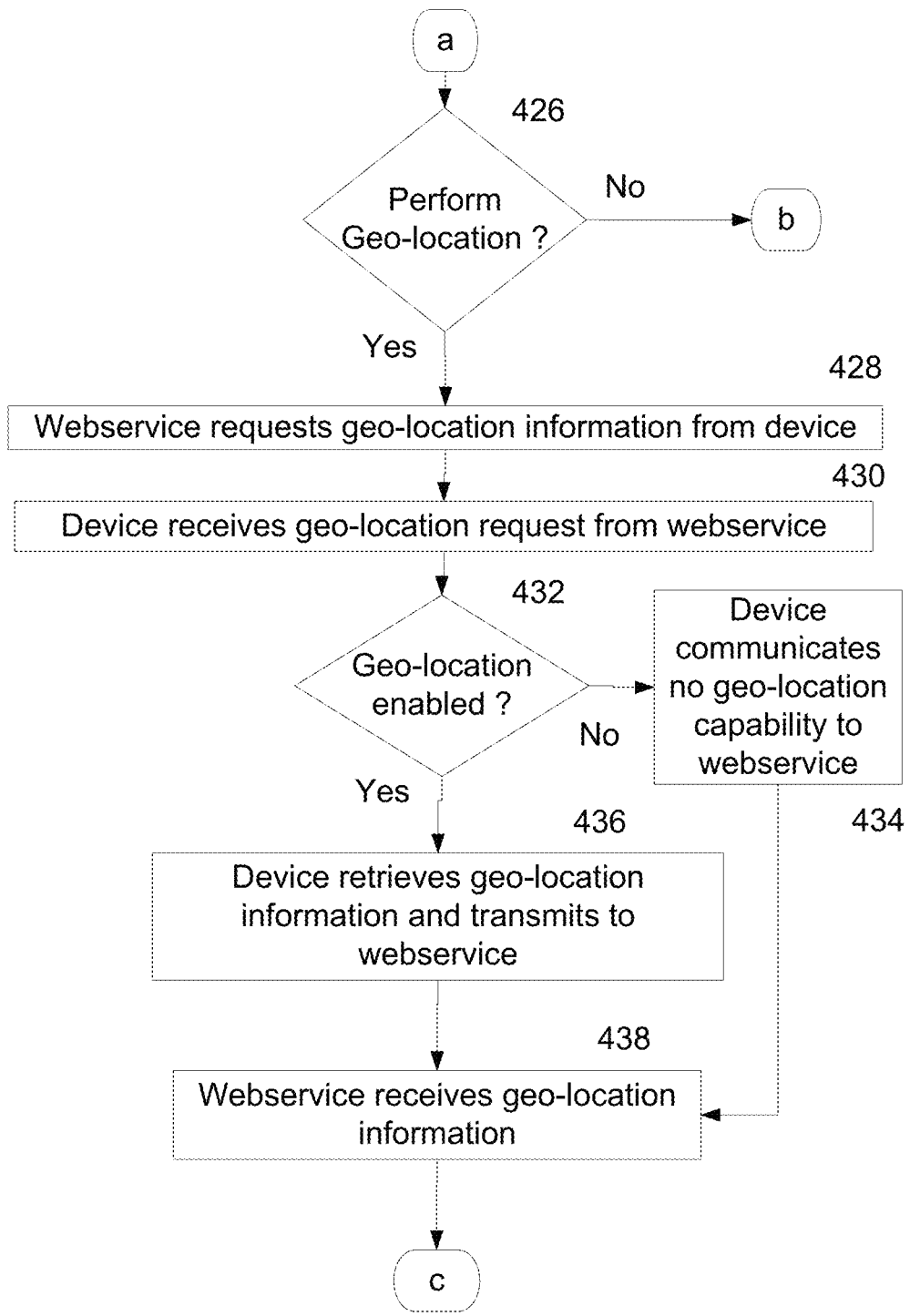
Figure 4C:
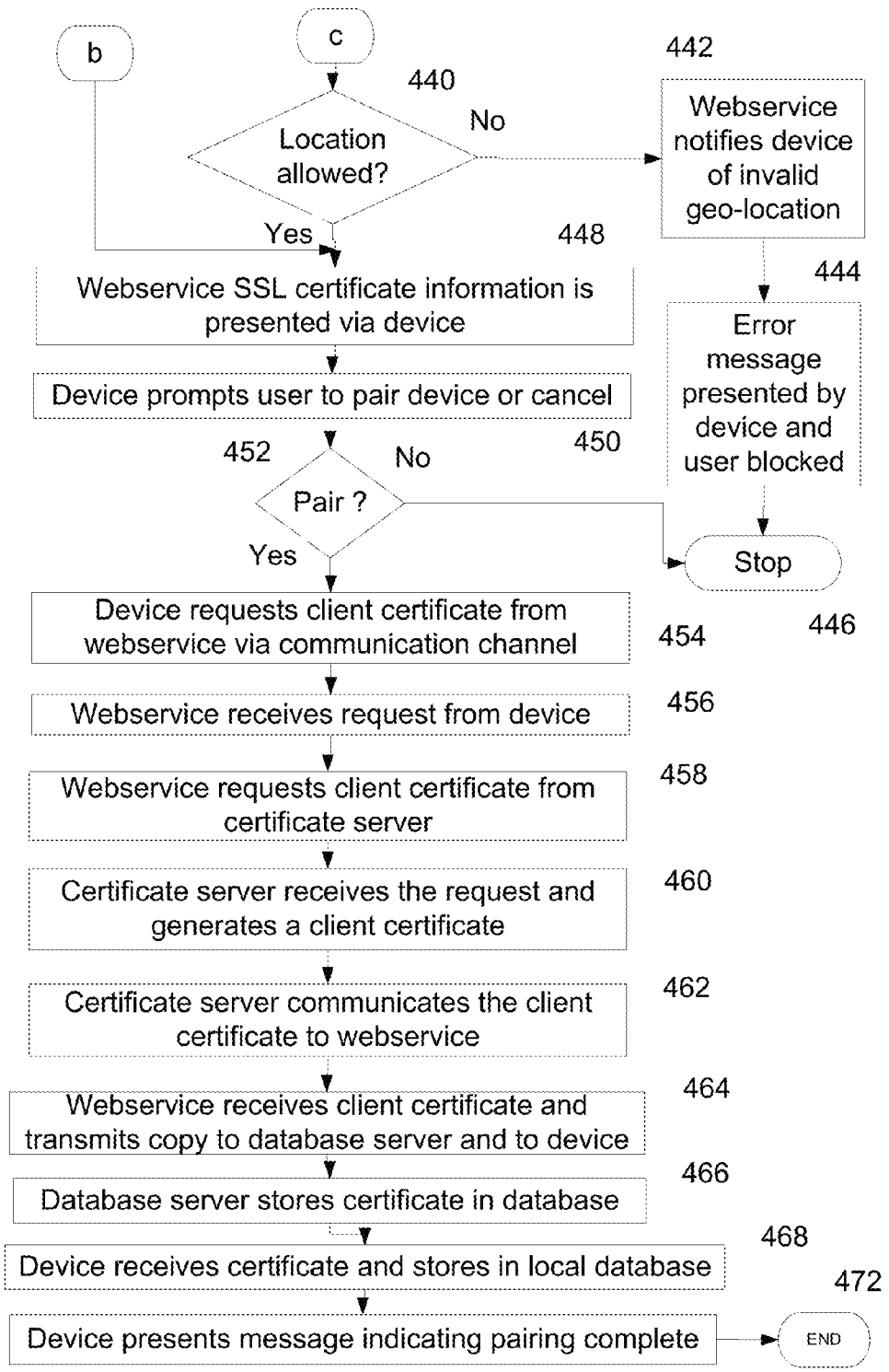

FIGS. 4A-C illustrate an example method for device pairing as described with reference to FIG. 1, in accordance with an embodiment of the present invention.

Referring to FIG. 4A, a method 400 initiates in a step 402.

Then in a step 404, user interfaces with website via device 106.

As a non-limiting example, user 130 (FIG. 1) communicates with website 102 (FIG. 1) in order to performing pairing.

Referring back to FIG. 4A, then in a step 406, device communicates with web-server.

As a non-limiting example, device 106 (FIG. 1) communicates with web-server 118 (FIG. 1) via communication channel 112 (FIG. 1), global communication network 104 (FIG. 1) and communication channel 110 (FIG. 1).

Referring back to FIG. 4A, then in a step 408, device requests web-service location file from web-server.

As a non-limiting example, device 106 (FIG. 1) requests location file 124 (FIG. 1) from web-server 118 (FIG. 1). Furthermore, location file 124 (FIG. 1) specifies web-service 122 (FIG. 1) for operation.

Referring back to FIG. 4A, then in a step 410, web-server retrieves web-service location file.

As a non-limiting example, web-server 118 (FIG. 1) retrieves location file 124 (FIG. 1).

Referring back to FIG. 4A, then in a step 412, web-server transmits web-service location file to device.

As a non-limiting example, web-server 118 (FIG. 1) transmits location file 124 (FIG. 1) to device 106 (FIG. 1).

Referring back to FIG. 4A, then in a step 414 device decodes web-service location file.

As a non-limiting example, device 106 (FIG. 1) decodes location file 124 (FIG. 1).

Referring back to FIG. 4A, then in a step 416 device communicates with web-service specified in location file.

As a non-limiting example, device 106 (FIG. 1) communicates with web-service 122 (FIG. 1) as noted via location file 124 (FIG. 1).

Referring back to FIG. 4A, then in a step 418 device validates web-service identity via commercial SSL certificate (not shown in FIG. 1).

As a non-limiting example, device 106 validates identity of web-service 122 (FIG. 1) using commercial SSL certificate.

Referring back to FIG. 4A, then in a step 420 a determination for a valid SSL certificate is performed.

Referring back to FIG. 4A, for a determination in step 420 for an invalid SSL certificate, then in a step 422 device presents warning message.

As a non-limiting example, device 106 (FIG. 1) presents a warning message to user 130 via GUI 134.

Referring back to FIG. 4A, then in a step 424, execution of method 400 terminates.

Referring back to FIG. 4A, for a determination in step 420 for a valid SSL certificate, then in a step 426 as described with reference to FIG. 4B, a determination for geo-location is performed.

Referring back to FIG. 4B, for a determination in step 426 for performing geo-location, then in a step 428 web-service requests geo-location information from device.

As a non-limiting example, web-service 122 (FIG. 1) request geo-location information from device 106 (FIG. 1).

Referring back to FIG. 4B, then in a step 430 device receives geo-location request from web-service.

As a non-limiting example, device 106 (FIG. 1) receives geo-location information request from web-service 122 (FIG. 1).

Referring back to FIG. 4B, then in a step 432 a determination for geo-location enabled is performed.

Referring back to FIG. 4B, for a determination in step 432 for geo-location not enabled, then in a step 434 device communicates no geo-location capability provided to web-service.

As a non-limiting example, device 106 (FIG. 1) transmits a message indicating no geo-location capability provided to web-service 122 (FIG. 1).

Referring back to FIG. 4B, for a determination in step 432 for geo-location enabled, then in a step 436 device retrieves geo-location information and transmits geo-location information to web-service.

As a non-limiting example, device 106 (FIG. 1) retrieves geo-location information and transmits geo-location information to web-service 122 (FIG. 1).

Referring back to FIG. 4B, then following step 434 and step 436, in a step 438 web-service receives geo-location information.

Referring to FIG. 4C, then in a step 440 a determination for location allowed is performed.

Referring back to FIG. 4C, for a determination in step 440 for location not allowed, then in a step 442, web-service notifies device of invalid geo-location.

As a non-limiting example, web-service 122 (FIG. 1) notifies device 106 (FIG. 1) of invalid geo-location.

Referring back to FIG. 4C, then in a step 444 an error message is presented by device and user is blocked.

As a non-limiting example, error message is presented by device 106 (FIG. 1) using GUI 134 (FIG. 1). Furthermore, user 130 (FIG. 1) is blocked from further access while located in an un-allowed geo-location.

Referring back to FIG. 4C, then in a step 446, execution of method 400 terminates.

Referring back to FIG. 4C, for a determination in step 440 for location allowed or for a determination in step 426 (FIG. 4B) for not performing geo-location, then in a step 448 web-service SSL certificate information is presented for viewing via device.

As a non-limiting example, web-service SSL certificate information is presented for viewing by device 106 (FIG. 1) to user 130 (FIG. 1).

Referring back to FIG. 4C, then in a step 450 device prompts user to pair device or cancel pairing.

As a non-limiting example, device 106 (FIG. 1) prompts user 130 (FIG. 1) to select to pair device or cancel pairing.

Referring back to FIG. 4C, then in a step 452 a determination for pairing is performed.

Referring back to FIG. 4C, for a determination in step 452 for not pairing, then in step 446 execution of method 400 terminates.

Referring back to FIG. 4C, for a determination in step 452 for pairing, then in a step 454 device requests client certificate from web-service via communication channel.

As a non-limiting example, device 106 (FIG. 1) requests client certificate from web-service 122 (FIG. 1).

Referring back to FIG. 4C, then in a step 456 web-service receives request from device.

As a non-limiting example, web-service 122 (FIG. 1) receives request from device 106 (FIG. 1).

Referring back to FIG. 4C, then in a step 458 web-service requests client certificate from certificate server.

As a non-limiting example, web-service 122 (FIG. 1) requests client certificate from certificate server 120 (FIG. 1).

Referring back to FIG. 4C, then in a step 460 certificate server receives the request and generates a client certificate.

As a non-limiting example, certificate server 120 (FIG. 1) receives the request and generates a client certificate.

Referring back to FIG. 4C, then in a step 462 certificate server communicates client certificate to web-service.

As a non-limiting example, certificate server 120 (FIG. 1) communicated client certificate to web-service 122 (FIG. 1).

Referring back to FIG. 4C, then in a step 464 web-service receives client certificate and transmits copy to database server and to device.

As a non-limiting example, web-service 122 (FIG. 1) receives client certificate and transmits copy to database server 116 (FIG. 1) and to device 106 (FIG. 1).

Referring back to FIG. 4C, then in a step 466 database server stores certificate in database.

As a non-limiting example, database server 116 (FIG. 1) stores certificate in database.

Referring back to FIG. 4C, then in a step 468 device receives certificate and stores in local database.

As a non-limiting example, device 106 (FIG. 1) receives certificate and stores in local database.

Referring back to FIG. 4C, then in a step 470 device presents message indicating pairing is complete.

As a non-limiting example, device 106 presents message to user 130 (FIG. 1) indicating pairing complete.

Referring back to FIG. 4C, then in a step 472 execution of method 400 terminates.

FIGS. 4A-C illustrate an example method for device pairing as described with reference to FIG. 1 where a device pairs with a website.

FIGS. 5A-D illustrate an example method for account pairing as described with reference to FIG. 1, in accordance with an embodiment of the present invention.

Figure 5A:
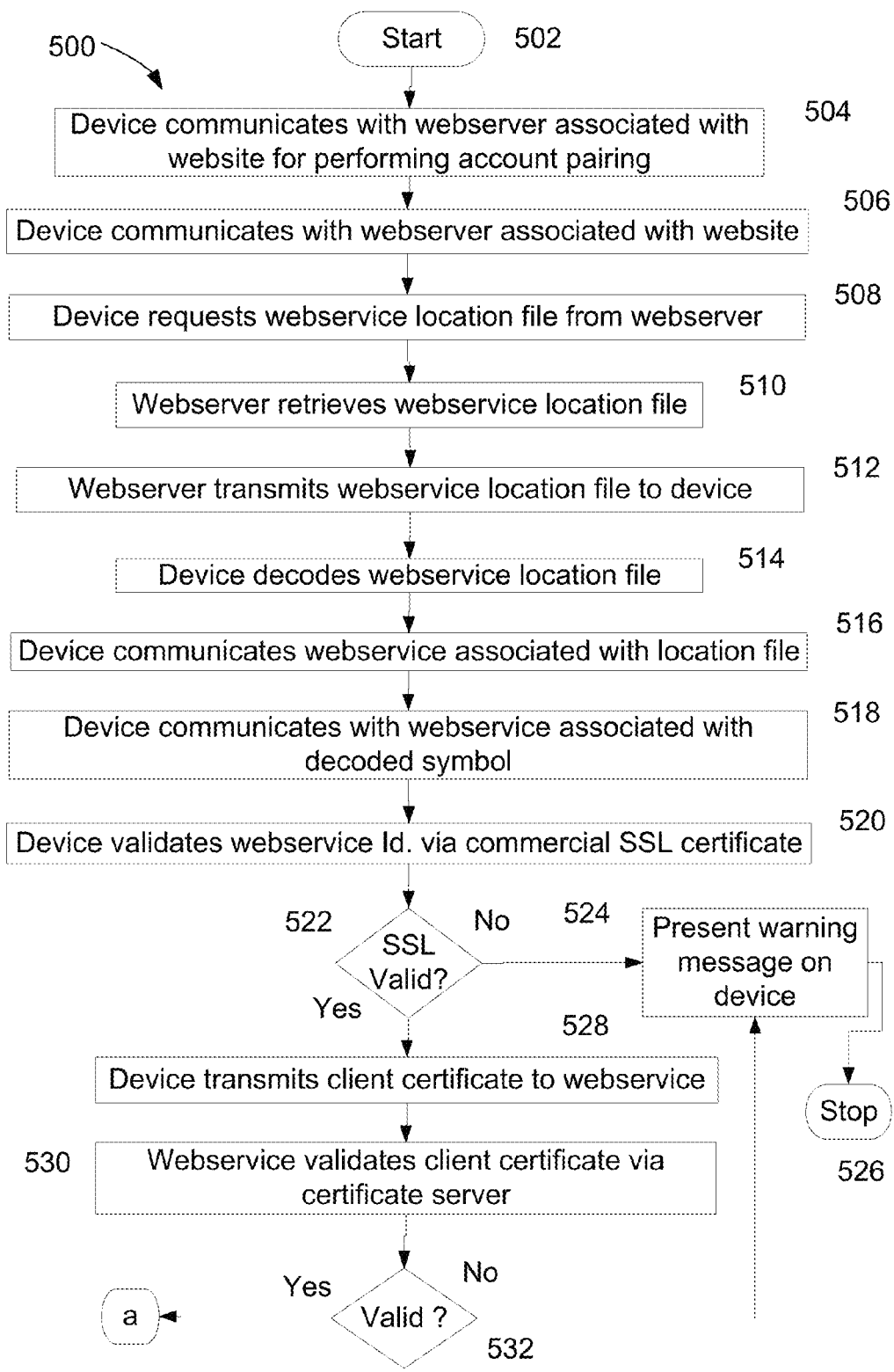
FIGS. 5A-D illustrate an example method for account pairing as described with reference to FIG. 1, in accordance with an embodiment of the present invention.

Referring to FIG. 5A, a method 500 initiates in a step 502.

Then in a step 504, device communicates with web-server associated with website for performing account pairing. Non-limiting examples of occurrences include seamless continuation after device pairing, initiated by the user on the device by selecting a menu option, and auto-initiated upon first scan of a QR code on a site where the device has been previously paired and the account has not been paired yet.

As a non-limiting example, device 106 (FIG. 1) communicates with web-server 118 (FIG. 1) associated with website 102 (FIG. 1) in order to perform account pairing.

Referring back to FIG. 5A, then in a step 506 device communicates with web-server associated with website.

As a non-limiting example, device 106 (FIG. 1) uses communication channel 112 (FIG. 1), global communication network 104 (FIG. 1) and communication channel 110 (FIG. 1) in order to communicate with web-server 118 (FIG. 1) of website 102 (FIG. 1).

Referring back to FIG. 5A, then in a step 508 device requests web-service location file from web-server.

As a non-limiting example, device 106 (FIG. 1) requests web-service location file 124 (FIG. 1) from web-server 118 (FIG. 1). Furthermore, web-service location file 124 (FIG. 1) may specify web-service 122 (FIG. 1).

Referring back to FIG. 5A, then in a step 510 web-server retrieves web-service location file.

As a non-limiting example, web-server 118 (FIG. 1) retrieves web-service location file 124 (FIG. 1).

Referring back to FIG. 5A, then in a step 512 web-server transmits web-service location file to device.

As a non-limiting example, web-server 118 (FIG. 1) communicates web-service location file 124 (FIG. 1) to device 106 (FIG. 1).

Referring back to FIG. 5A, then in a step 514 device decodes web-service location file.

As a non-limiting example, device 106 (FIG. 1) decodes web-service location file 124 (FIG. 1).

Referring back to FIG. 5A, then in a step 516 device communicates web-service associated with location file.

As a non-limiting example, device 106 (FIG. 1) communicates with web-service 122 (FIG. 1) associated with location file 124 (FIG. 1).

Referring back to FIG. 5A, then in a step 518 device communicates with web-service associated with decoded symbol.

As a non-limiting example, device 106 (FIG. 1) communicates web-service 122 (FIG. 1) as identified via the decoded information associated with symbol 138 (FIG. 1).

Referring back to FIG. 5A, then in a step 520 device validates web-service identification via commercial SSL certificate (not shown in FIG. 1).

As a non-limiting example, device 106 (FIG. 1) validates web-service 122 (FIG. 1) via commercial SSL certificate.

Referring back to FIG. 5A, then in a step 522 a determination for SSL validity is performed.

As a non-limiting example, a determination for SSL certificate validity is performed by device 106 (FIG. 1).

Referring back to FIG. 5A, for a determination of invalid SSL in step 522, then in a step 524 device presents a warning message for viewing.

As a non-limiting example, device 106 (FIG. 1) presents a warning message associated with invalid SSL to user 130 (FIG. 1).

Referring back to FIG. 5A, then in a step 526 execution of method 500 terminates.

Referring back to FIG. 5A, for a determination of valid SSL in step 522, then in a step 528 device transmits client certificate to web-service.

As a non-limiting example, device 106 (FIG. 1) transmits client certificate information to web-service 122 (FIG. 1).

Referring back to FIG. 5A, then in a step 530 web-service validates client certificate via certificate server.

As a non-limiting example, web-service 122 (FIG. 1) validates client certificate with certificate server 120 (FIG. 1).

Referring back to FIG. 5A, then in a step 532 a determination for valid client certificate is performed.

As a non-limiting example, device 106 (FIG. 1) performs determination for validity associated with client certificate.

Referring back to FIG. 5A, for a determination of an invalid client certificate in step 532, execution of method 500 transition to step 524 followed by step 526.

Figure 5B:
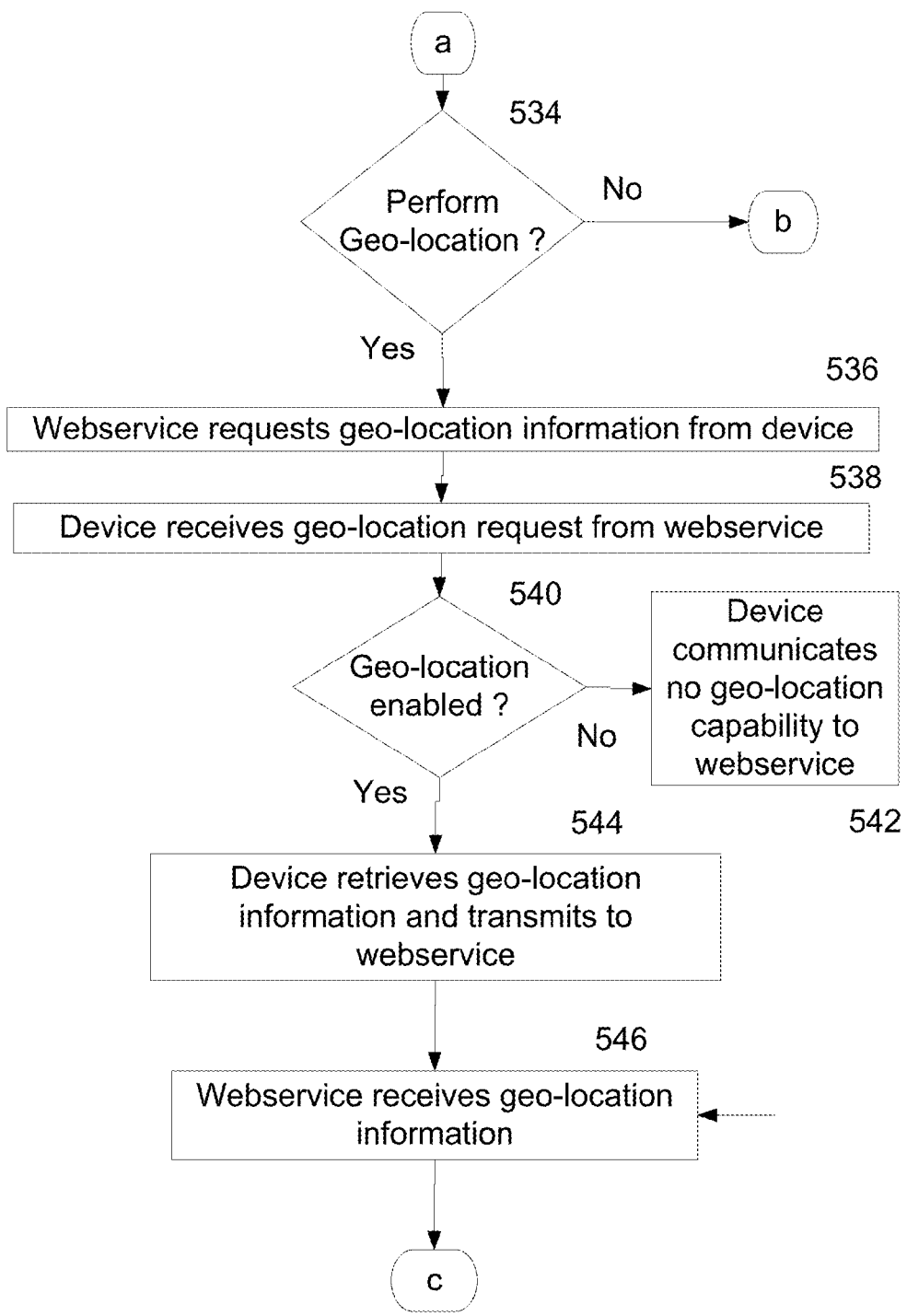

For a determination of a valid client certificate in step 532, in a step 534 a determination for performing geo-location is executed as described with reference to FIG. 5B.

Referring back to FIG. 5B, for a determination in step 534 for performing geo-location, then in a step 536 web-service requests geo-location information from device.

As a non-limiting example, web-service 122 (FIG. 1) requests geo-location information from device 106 (FIG. 1).

As a non-limiting example, web-service 122 (FIG. 1) request geo-location information from device 106 (FIG. 1).

Referring back to FIG. 5B, then in a step 538 device receives geo-location request from web-service.

As a non-limiting example, device 106 (FIG. 1) receives geo-location information request from web-service 122 (FIG. 1).

Referring back to FIG. 5B, then in a step 540 a determination for geo-location enabled is performed.

Referring back to FIG. 5B, for a determination in step 540 for geo-location not enabled, then in a step 542 device communicates no geo-location capability provided to web-service.

As a non-limiting example, device 106 (FIG. 1) transmits a message indicating no geo-location capability provided to web-service 122 (FIG. 1).

Referring back to FIG. 5B, for a determination in step 540 for geo-location enabled, then in a step 544 device retrieves geo-location information and transmits geo-location information to web-service.

As a non-limiting example, device 106 (FIG. 1) retrieves geo-location information and transmits geo-location information to web-service 122 (FIG. 1).

Referring back to FIG. 5B, then following step 542 and step 544, in a step 546 web-service receives geo-location information.

As a non-limiting example, web-service 122 (FIG. 1) receives geo-location information.

Figure 5C:
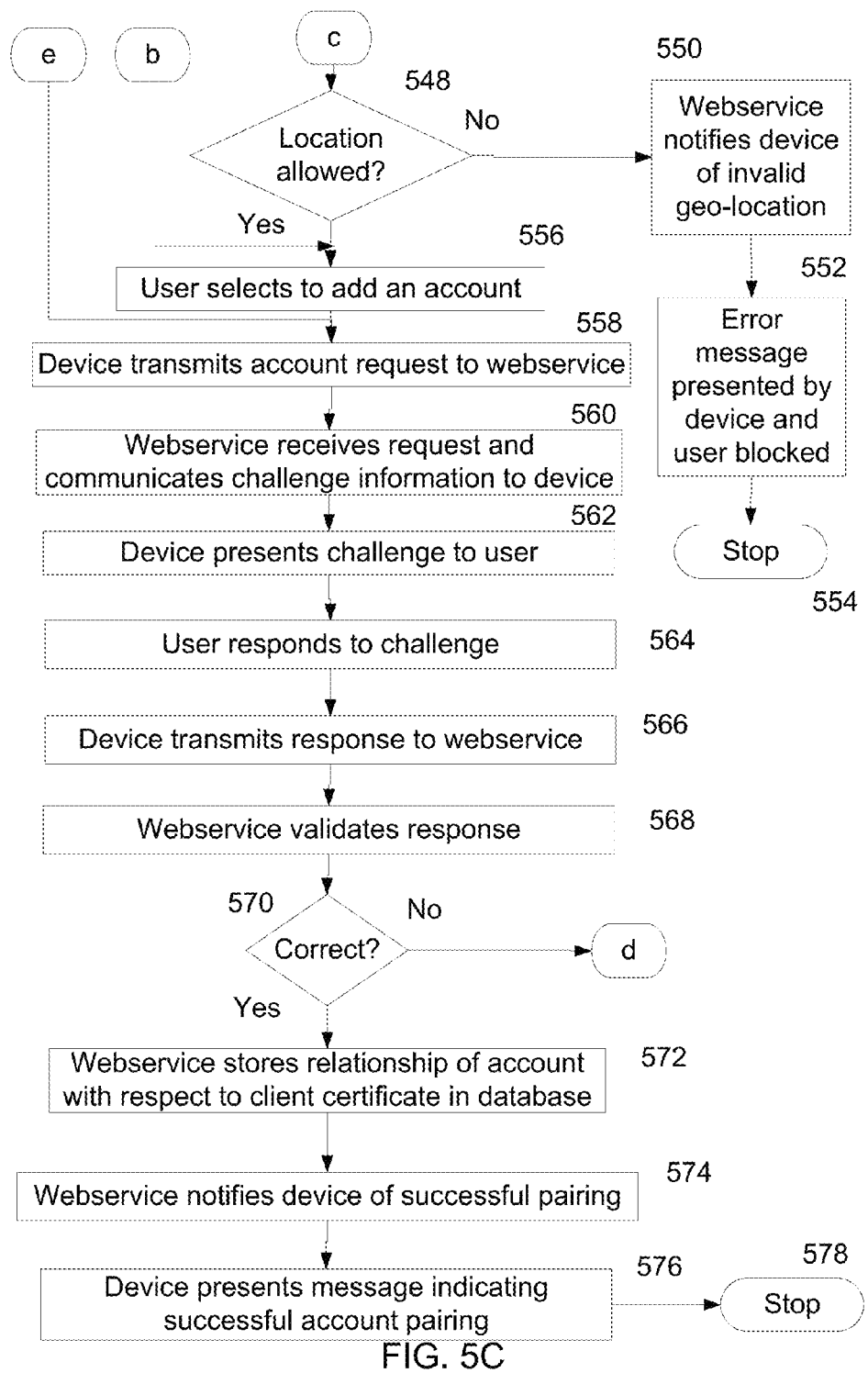

Referring to FIG. 5C, then in a step 548 a determination for location allowed is performed.

As a non-limiting example, web-service 122 (FIG. 1) performs determination for location allowed.

Referring back to FIG. 5C, for a determination in step 548 for location not allowed, then in a step 550, web-service notifies device of invalid geo-location.

As a non-limiting example, web-service 122 (FIG. 1) notifies device 106 (FIG. 1) of invalid geo-location.

Referring back to FIG. 5C, then in a step 552 an error message is presented by device and user is blocked.

As a non-limiting example, error message is presented by device 106 (FIG. 1) using GUI 134 (FIG. 1). Furthermore, user 130 (FIG. 1) is blocked from further access while located in an un-allowed geo-location.

Referring back to FIG. 5C, then in a step 554, execution of method 500 terminates.

Referring back to FIG. 5C, for a determination in step 548 for location allowed or for a determination in step 534 (FIG. 5B) for not performing geo-location, then in a step 556 user selects to add an account.

As a non-limiting example, as a non-limiting example, user 130 (FIG. 1), via device 106 (FIG. 1), selects to add an account.

Referring back to FIG. 5C, then in a step 558 device transmits account request to web-service.

As a non-limiting example, device 106 (FIG. 1) transmits add account request to web-service 122 (FIG. 1).

Referring back to FIG. 5C, then in a step 560 web-service receives request and communicates challenge information to device.

As a non-limiting example, web-service 122 (FIG. 1) receives request and communicates challenge questions to device 106 (FIG. 1).

Referring back to FIG. 5C, then in a step 562 device presents challenge to user.

As a non-limiting example, device 106 (FIG. 1) presents challenge questions to user 130 (FIG. 1).

Referring back to FIG. 5C, then in a step 564 user responds to challenge.

As a non-limiting example, user 130 (FIG. 1) responds to challenge questions using device 106 (FIG. 1).

Referring back to FIG. 5C, then in a step 566 device transmits response to web-service.

As a non-limiting example, device 106 (FIG. 1) transmits responses to challenge questions to web-service 122 (FIG. 1).

Referring back to FIG. 5C, then in a step 568 web-service validates response.

As a non-limiting example, web-service 122 (FIG. 1) validates answers to challenge questions.

Referring back to FIG. 5C, then in a step 570 a determination for a correct response is performed.

Referring back to FIG. 5C, for a valid response in step 570, then in a step 572 web-service stores relationship of account with respect to client in database.

As a non-limiting example, web-service 122 (FIG. 1) stores relationship of account to client certificate in database server 116 (FIG. 1).

Referring back to FIG. 5C, then in a step 574 web-service notifies device of successful pairing.

As a non-limiting example, web-service 122 (FIG. 1) notifies device 106 (FIG. 1) of successful pairing.

Referring back to FIG. 5C, then in a step 576 device presents message indicating successful account pairing.

As a non-limiting example, device 106 (FIG. 1) presents message indicating successful pairing.

Referring back to FIG. 5C, then in a step 578 execution of method 500 terminates.

Figure 5D:
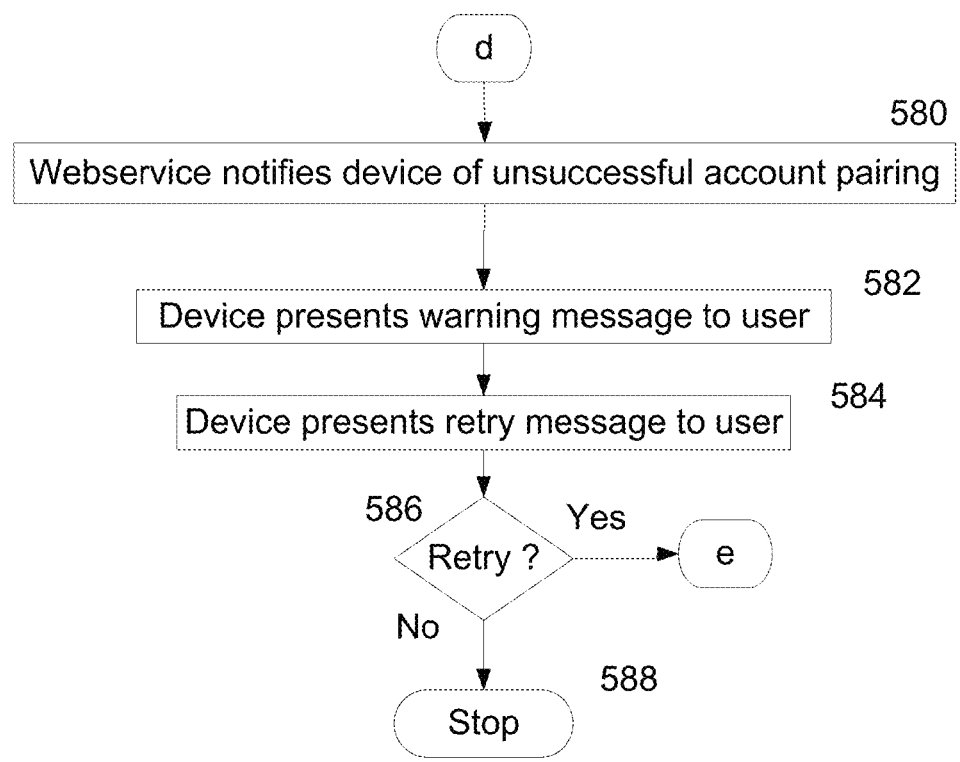

Referring back to FIG. 5C, for a determination of an incorrect response in step 570, then in a step 580, described with reference to FIG. 5D, web-service notifies device of unsuccessful account pairing.

As a non-limiting example, web-service 122 (FIG. 1) notifies device 106 (FIG. 1) of unsuccessful account pairing.

Referring back to FIG. 5D, then in a step 582 device presents warning message to user.

As a non-limiting example, device 106 (FIG. 1) presents warning message to user 130.

Referring back to FIG. 5D, then in a step 584 device presents retry message to user.

As a non-limiting example, device 106 (FIG. 1) presents a retry message to user 130 (FIG. 1).

Referring back to FIG. 5D, in a step 586 a determination for a retry is performed.

Referring back to FIG. 5D, for a determination of performing a retry in step 586, execution of method 500 transitions to step 558 described with reference to FIG. 5C.

Referring back to FIG. 5D, for a determination of not performing a retry in step 586, then in a step 588 execution of method 500 terminates.

FIGS. 5A-D illustrate an example method for account pairing as described with reference to FIG. 1 where a device is paired with an account.

Figure 6A:
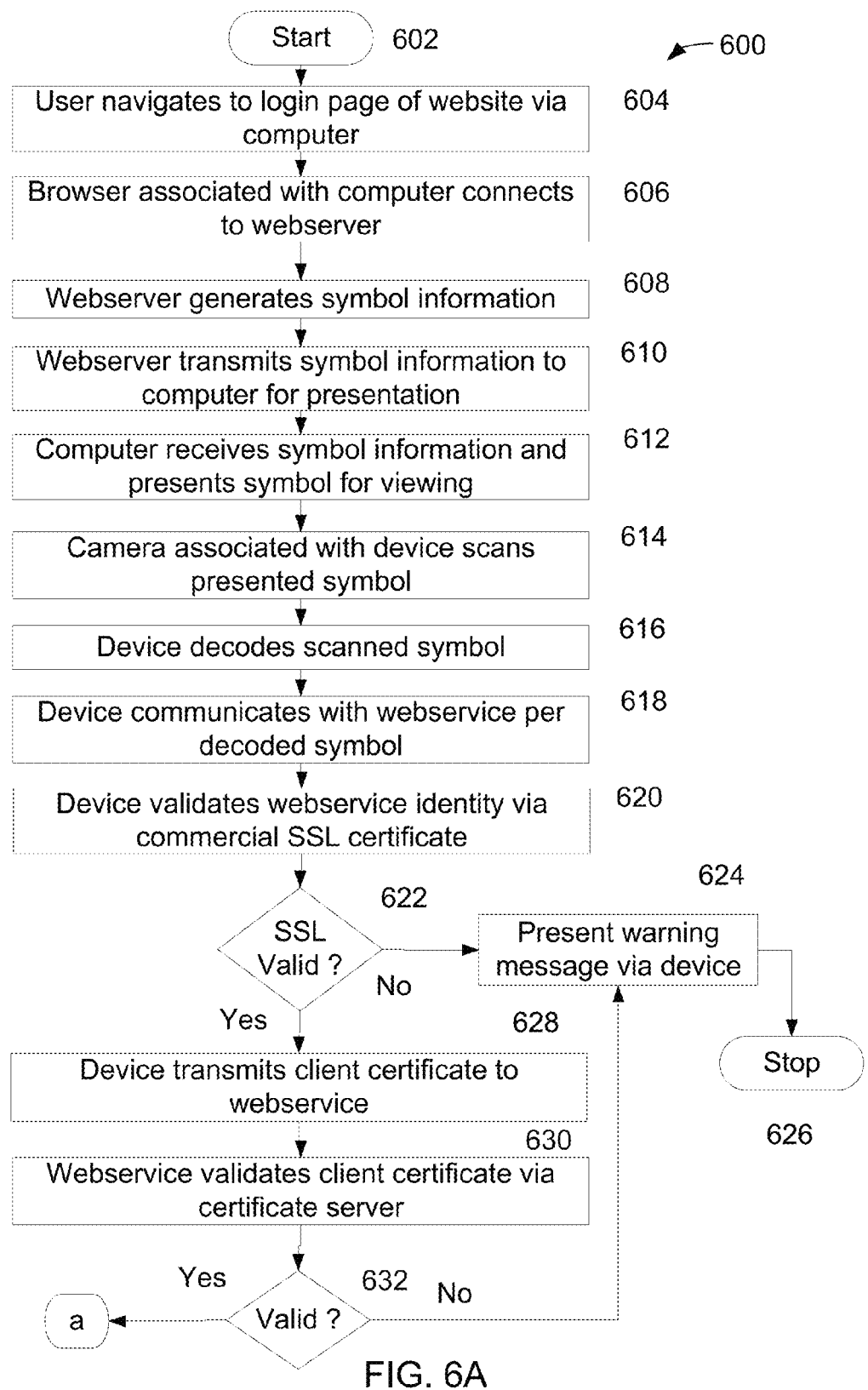
FIGS. 6A-C illustrate an example method for authentication as described with reference to FIG. 1, in accordance with an embodiment of the present invention.
Figure 6B:
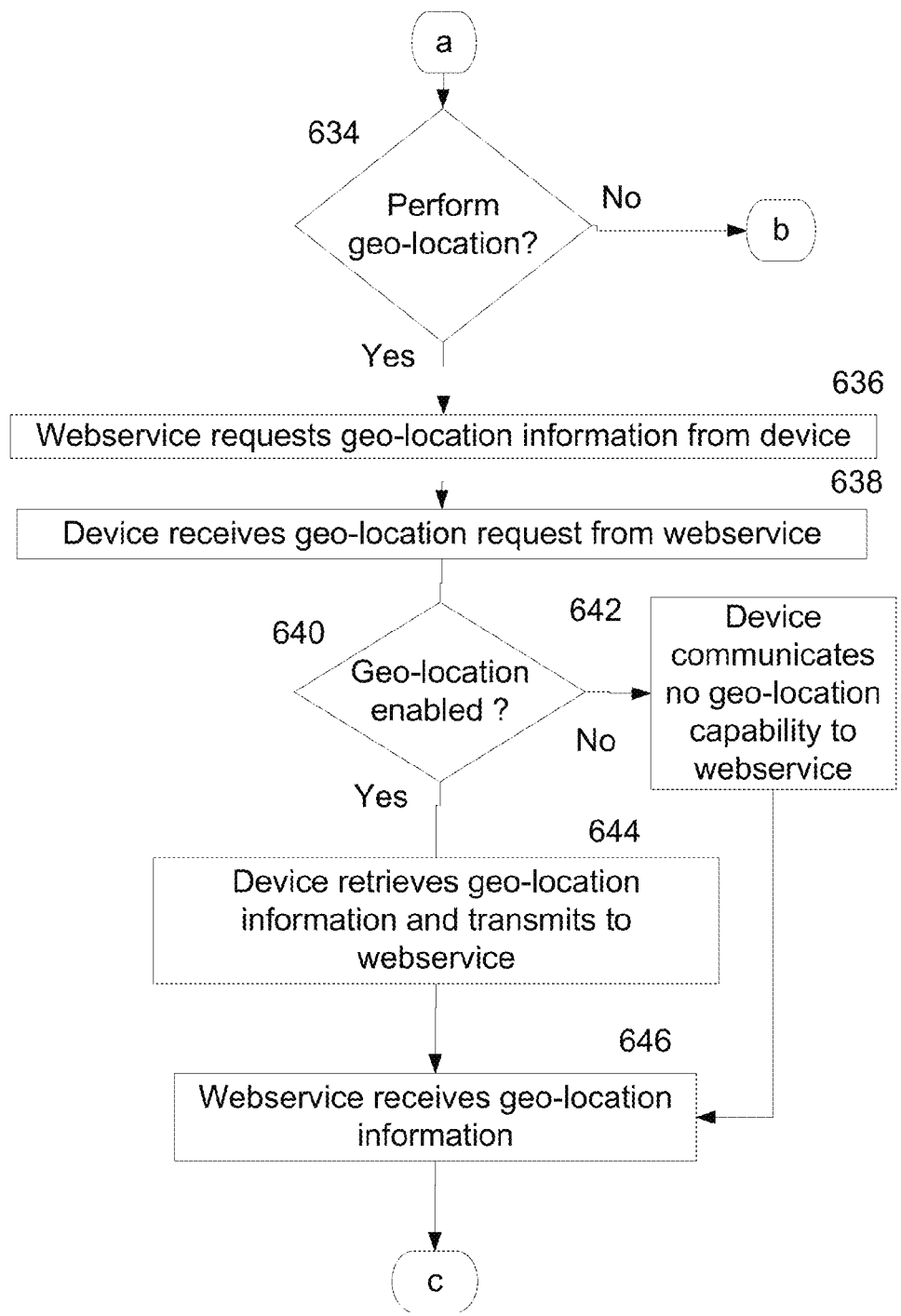
Figure 6C:
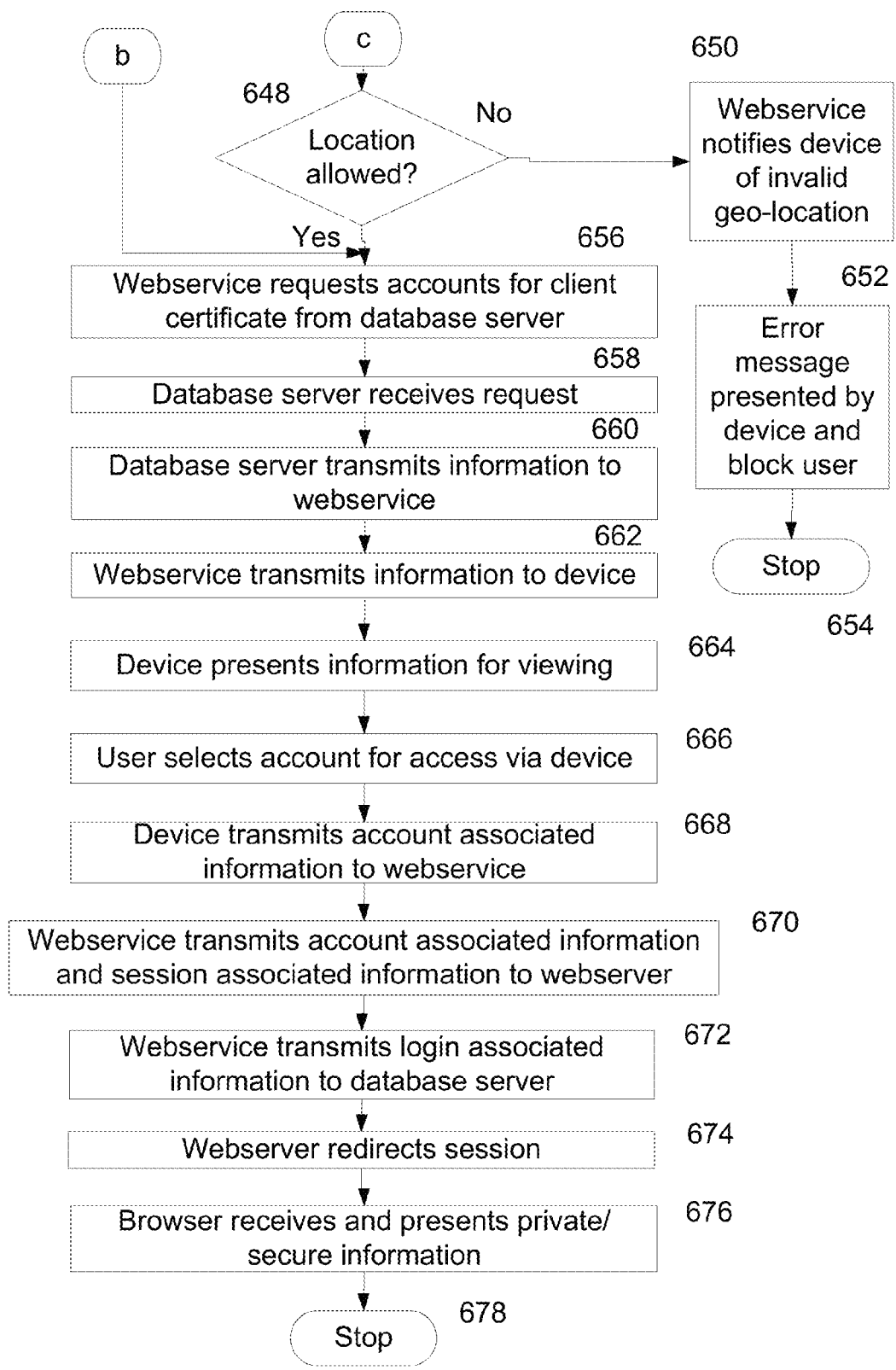

FIGS. 6A-C illustrate an example method for authentication as described with reference to FIG. 1, in accordance with an embodiment of the present invention.

Referring to FIG. 6A, a method 600 initiates in a step 602.

Then in a step 604, user navigates to login page of website via computer.

As a non-limiting example, user 130 (FIG. 1), via computing device 108 (FIG. 1) navigates to login page of website 102 (FIG. 1).

Referring back to FIG. 6A, then in a step 606 browser associated with computer connects to web-server.

As a non-limiting example, browser associate with computing device 108 (FIG. 1) communicates with web-server 118 (FIG. 1).

Referring back to FIG. 6A, then in a step 608 web-server generates symbol information.

As a non-limiting example, web-server 118 (FIG. 1) generates symbol 138 (FIG. 1). Furthermore, generated symbol 138 (FIG. 1) may include URL and unique session parameter.

Referring back to FIG. 6A, then in a step 610 web-server transmits symbol information to computer for presentation.

As a non-limiting example, web-server 118 (FIG. 1) transmits symbol 138 (FIG. 1) information to computing device 108 (FIG. 1).

Referring back to FIG. 6A, then in a step 612 computer receives symbol information and presents symbol for viewing.

As a non-limiting example, computing device 108 (FIG. 1) receives symbol 138 (FIG. 1) information and presents symbol 138 (FIG. 1) information for viewing via GUI 126 (FIG. 1).

Referring back to FIG. 6A, then in a step 614 camera associated with device scans presented symbol.

As a non-limiting example, user 130 (FIG. 1) uses camera 136 (FIG. 1) associated with device 106 (FIG. 1) in order to capture the image of and/or scan symbol 138 (FIG. 1).

Referring back to FIG. 6A, then in a step 616 device decodes scanned symbol.

As a non-limiting example, device 106 (FIG. 1) decodes information associated with scanned symbol 138 (FIG. 1). Furthermore, decoded information may include URL and session parameter.

Referring back to FIG. 6A, then in a step 618 device communicates with web-service per decoded symbol.

As a non-limiting example, device 106 (FIG. 1) communicates with web-service 122 (FIG. 1) as indicated by the decoded information associated with symbol 138 (FIG. 1).

Referring back to FIG. 6A, then in a step 620 device validates web-service identity via commercial SSL certificate.

As a non-limiting example, device 106 (FIG. 1) validates web-service 122 (FIG. 1) identity via commercial SSL certificate.

Referring back to FIG. 6A, then in a step 622 a determination for a valid SSL is performed.

Referring back to FIG. 6A, for a determination in step 622 for an invalid SSL certificate, then in a step 624 a warning message is presented via device.

As a non-limiting example, as a non-limiting example, device 106 (FIG. 1) presents warning message to user 130 (FIG. 1) with regard to invalid SSL certificate.

Referring back to FIG. 6A, then in a step 626 execution of method 600 terminates.

Referring back to FIG. 6A, for a determination in step 622 for a valid SSL, then in a step 628, device transmits client certificate to web-service.

As a non-limiting example, device 106 (FIG. 1) transmits client certificate information to web-service 122 (FIG. 1).

Referring back to FIG. 6A, then in a step 630 web-service validates client certificate via certificate server.

As a non-limiting example, web-service 122 (FIG. 1) validates client certificate via certificate server 120 (FIG. 1).

Referring back to FIG. 6A, then in a step 632 a determination for a valid client certificate is performed.

For a determination of an invalid client certificate in step 632, in step 624 a warning messaged is presented via device followed by terminating execution of method 600 in step 626.

For a determination of a valid client certificate in step 632, in a step 634 a determination for performing geo-location is executed as described with reference to FIG. 6B.

Referring back to FIG. 6B, for a determination in step 634 for performing geo-location, then in a step 636 web-service requests geo-location information from device.

As a non-limiting example, web-service 122 (FIG. 1) request geo-location information from device 106 (FIG. 1).

Referring back to FIG. 6B, then in a step 638 device receives geo-location request from web-service.

As a non-limiting example, device 106 (FIG. 1) receives geo-location information request from web-service 122 (FIG. 1).

Referring back to FIG. 6B, then in a step 640 a determination for geo-location enabled is performed.

Referring back to FIG. 6B, for a determination in step 640 for geo-location not enabled, then in a step 642 device communicates no geo-location capability provided to web-service.

As a non-limiting example, device 106 (FIG. 1) transmits a message indicating no geo-location capability provided to web-service 122 (FIG. 1).

Referring back to FIG. 6B, for a determination in step 640 for geo-location enabled, then in a step 644 device retrieves geo-location information and transmits geo-location information to web-service.

As a non-limiting example, device 106 (FIG. 1) retrieves geo-location information and transmits geo-location information to web-service 122 (FIG. 1).

Referring back to FIG. 6B, then following step 642 and step 644, in a step 646 web-service receives geo-location information.

Referring to FIG. 6C, then in a step 648 a determination for location allowed is performed.

Referring back to FIG. 6C, for a determination in step 648 for location not allowed, then in a step 650, web-service notifies device of invalid geo-location.

As a non-limiting example, web-service 122 (FIG. 1) notifies device 106 (FIG. 1) of invalid geo-location.

Referring back to FIG. 6C, then in a step 652 an error message is presented by device and user is blocked.

As a non-limiting example, error message is presented by device 106 (FIG. 1) using GUI 134 (FIG. 1). Furthermore, user 130 (FIG. 1) is blocked from further access while located in an un-allowed geo-location.

Referring back to FIG. 6C, then in a step 654, execution of method 600 terminates.

Referring back to FIG. 6C, for a determination in step 648 for location allowed or for a determination in step 634 (FIG. 6B) for not performing geo-location, then in a step 656 web-service requests accounts for client certificate from database server.

As a non-limiting example, as a non-limiting example, web-service 122 (FIG. 1) requests account information associated with client certificate from database server 116 (FIG. 1). If only one account exists or a user is restricted from having multiple accounts, steps 658-668 are optional.

Referring back to FIG. 6C, then in a step 658 database server receives request.

As a non-limiting example, database server 116 (FIG. 1) receives request.

Referring back to FIG. 6C, then in a step 660 database server transmits information to web-service.

As a non-limiting example, database server 116 (FIG. 1) transmits information to web-service 122 (FIG. 1). Furthermore, transmitted information may include list of accounts, quantity of devices with access and prior access information.

Referring back to FIG. 6C, then in a step 662 web-service transmits information to device.

As a non-limiting example, web-service 122 (FIG. 1) transmits information to device 106 (FIG. 1).

Referring back to FIG. 6C, then in a step 664 device presents information for viewing.

As a non-limiting example, device 106 (FIG. 1) presents information to user 130 (FIG. 1) for viewing via GUI 134 (FIG. 1).

Referring back to FIG. 6C, then in a step 666 user selects account for access via device.

As a non-limiting example, user 130 (FIG. 1) selects account for access via device 106 (FIG. 1).

Referring back to FIG. 6C, then in a step 668 device transmits account associated information to web-service.

As a non-limiting example, device 106 (FIG. 1) transmits account associated information to web-service 122 (FIG. 1).

Referring back to FIG. 6C, then in a step 670 web-service transmits account associated information and session information to web-server.

As a non-limiting example, web-service 122 (FIG. 1) transmits information to web-server 118 (FIG. 1). Furthermore, transmitted information may included account associated information and session information.

Referring back to FIG. 6C, then in a step 672 web-service transmits login associated information to database server. This step provides an audit function and is optional.

As a non-limiting example, web-service 122 (FIG. 1) transmits login associated information to database server 116 (FIG. 1).

Referring back to FIG. 6C, then in a step 674 web-server redirects session.

As a non-limiting example, web-server 118 (FIG. 1) redirects session. As a non-limiting example, redirection may be to a private and/or secure page.

Referring back to FIG. 6C, then in a step 676 browser receives and presents private/secure information.

As a non-limiting example, browser receives and presents information for viewing to user 130 (FIG. 1) via computing device 108 (FIG. 1). Furthermore, information may be presented via a private and/or secure page.

Referring back to FIG. 6C, then in a step 678 execution of method 600 terminates execution.

FIGS. 6A-C illustrate an example method for account pairing as described with reference to FIG. 1 where a device pairs with account information.

Figure 7A:
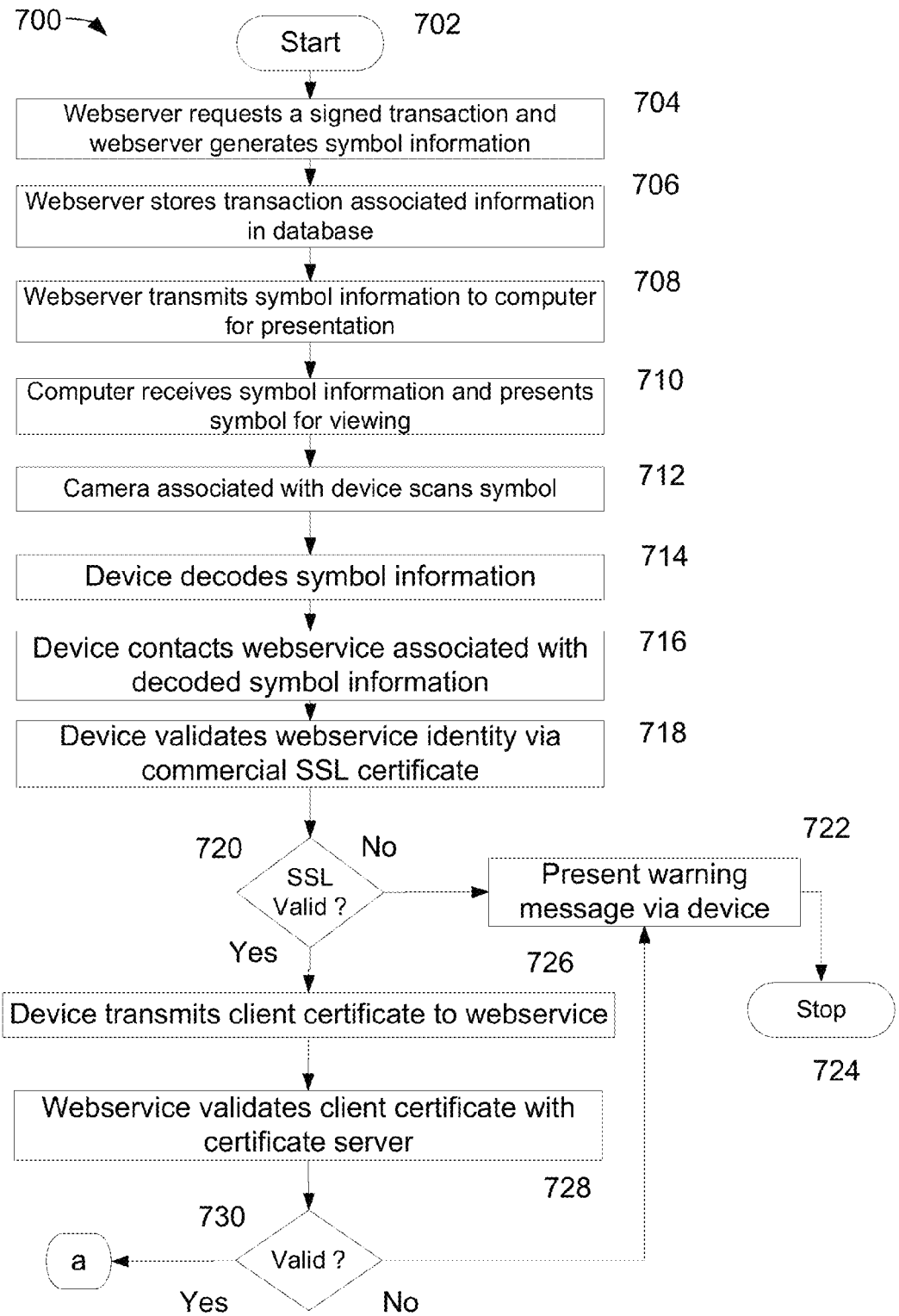
FIGS. 7A-C illustrate an example method for performing a signed transaction as described with reference to FIG. 1, in accordance with an embodiment of the present invention.
Figure 7B:
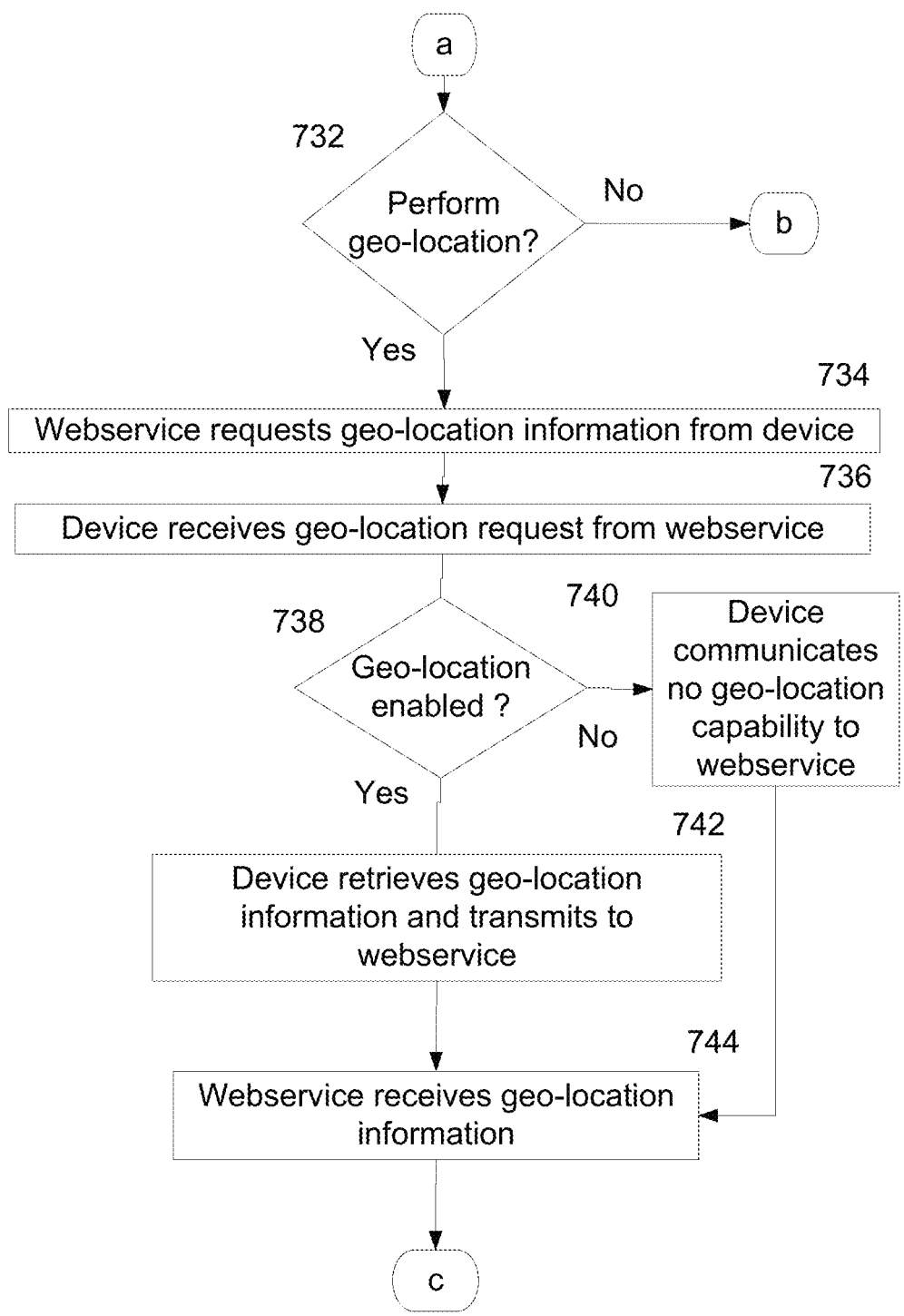
Figure 7C:
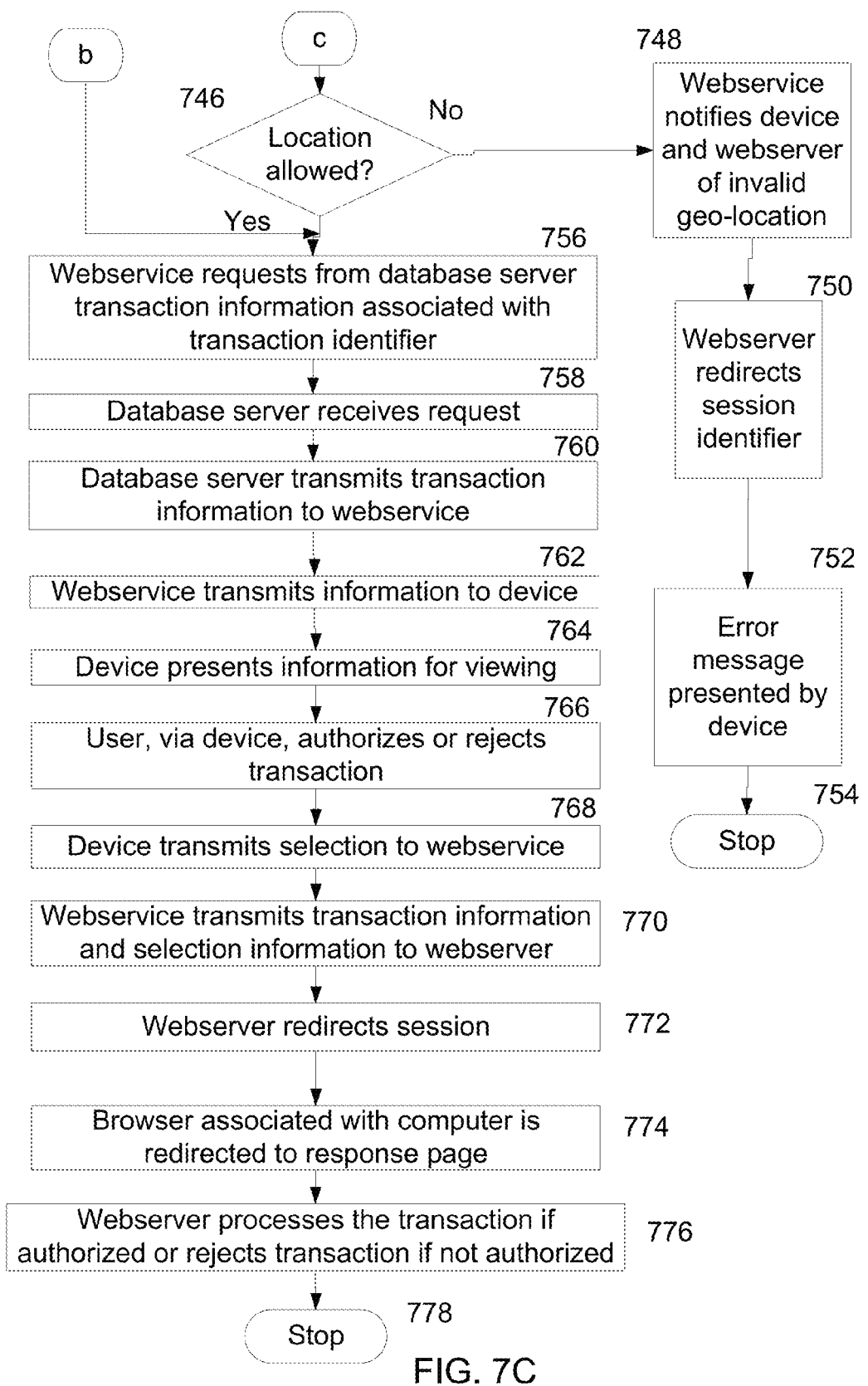

FIGS. 7A-C illustrate an example method for performing a signed transaction as described with reference to FIG. 1, in accordance with an embodiment of the present invention.

Referring to FIG. 7A, a method 700 initiates in a step 702. Then in a step 704, web-server requests a signed transaction and web-server generates symbol information.

As a non-limiting example, web-server 118 (FIG. 1) requests a signed transaction and generates information associated with symbol 138 (FIG. 1). Furthermore, information associated with symbol 138 (FIG. 1) may include URL and transaction identifier.

Referring back to FIG. 7A, then in a step 706 web-server stores transaction associated information in database.

As a non-limiting example, web-server 118 (FIG. 1) stores transaction associated information in database. Furthermore, stored information may include transaction identifier, transaction detail and session identifier. In other embodiments, the web server and web-service exchanging information directly and store the client certificate in the existing account authentication system and don't require a database server.

Referring back to FIG. 7A, then in a step 708 web-server transmits symbol information to computer for presentation.

As a non-limiting example, as a non-limiting example, web-server 118 (FIG. 1) transmits symbol 138 (FIG. 1) information to computing device 108 (FIG. 1) for presentation.

Referring back to FIG. 7A, then in a step 710 computer receives symbol information and presents symbol for viewing.

As a non-limiting example, computing device 108 (FIG. 1) receives symbol 138 (FIG. 1) information and presents information for viewing via GUI 126 (FIG. 1).

Referring back to FIG. 7A, then in a step 712 camera associated with device scans symbol.

As a non-limiting example, user 130 (FIG. 1) uses camera 136 (FIG. 1) associated with device 106 (FIG. 1) in order to capture image and/or scan symbol 138 (FIG. 1).

Referring back to FIG. 7A, then in a step 714 device decodes symbol information.

As a non-limiting example, device 106 (FIG. 1) decodes symbol 138 (FIG. 1) information. Furthermore, information may include URL and transaction identifier.

Referring back to FIG. 7A, then in a step 716 device contacts web-service associated with decoded symbol information.

As a non-limiting example, device 106 (FIG. 1) communicates with web-service 122 (FIG. 1) as indicated by decoded symbol 138 (FIG. 1) information. Furthermore, communication may include use of a transaction identifier.

Referring back to FIG. 7A, then in a step 718 device validates web-service identity via commercial SSL certificate.

As a non-limiting example, device 106 (FIG. 1) validates web-service 122 (FIG. 1) identity via commercial SSL certificate (not shown in FIG. 1).

Referring back to FIG. 7A, then in a step 720 SSL validation is performed.

Referring back to FIG. 7A, for a determination of an invalid SSL in step 720, then in a step 722 device presents a warning message.

As a non-limiting example, a warning message associated with invalid SSL is presented to user via GUI 134 (FIG. 1) associated with device 106 (FIG. 1).

Referring back to FIG. 7A, then in a step 724 execution of method 724 terminates.

Referring back to FIG. 7A, for a determination of a valid SSL in step 720, then in a step 726 device transmits client certificate to web-service.

As a non-limiting example, device 106 (FIG. 1) transmits client certificate information to web-service 122 (FIG. 1).

Referring back to FIG. 7A, then in a step 728 web-service validates client certificate with certificate server.

As a non-limiting example, web-service 122 (FIG. 1) validates client certificate with certificate server 120 (FIG. 1).

Referring back to FIG. 7A, then in a step 730 a determination for a valid client certificate is performed.

Referring back to FIG. 7A, for a determination of an invalid client certificate in step 730, execution of method 700 transitions to step 722 followed by step 724.

Referring back to FIG. 7A, for a determination of a valid client certificate in step 730, then in a step 732 as described with reference to FIG. 7B, a determination for geo-location is performed.

Referring back to FIG. 7B, for a determination in step 732 for performing geo-location, then in a step 734 web-service requests geo-location information from device.

As a non-limiting example, web-service 122 (FIG. 1) request geo-location information from device 106 (FIG. 1).

Referring back to FIG. 7B, then in a step 736 device receives geo-location request from web-service.

As a non-limiting example, device 106 (FIG. 1) receives geo-location information request from web-service 122 (FIG. 1).

Referring back to FIG. 7B, then in a step 738 a determination for geo-location enabled is performed.

Referring back to FIG. 7B, for a determination in step 738 for geo-location not enabled, then in a step 740 device communicates no geo-location capability provided to web-service.

As a non-limiting example, device 106 (FIG. 1) transmits a message indicating no geo-location capability provided to web-service 122 (FIG. 1).

Referring back to FIG. 7B, for a determination in step 738 for geo-location enabled, then in a step 742 device retrieves geo-location information and transmits geo-location information to web-service.

As a non-limiting example, device 106 (FIG. 1) retrieves geo-location information and transmits geo-location information to web-service 122 (FIG. 1).

Referring back to FIG. 7B, then following step 740 and step 742, in a step 744 web-service receives geo-location information.

Referring to FIG. 7C, then in a step 746 a determination for location allowed is performed.

Referring back to FIG. 7C, for a determination in step 746 for location not allowed, then in a step 748, web-service notifies device of invalid geo-location.

As a non-limiting example, web-service 122 (FIG. 1) notifies device 106 (FIG. 1) of invalid geo-location.

Referring back to FIG. 7C, then in a step 750 web-server redirects session identifier.

As a non-limiting example, web-server 118 redirects the session tied to the transaction identifier to the reject transaction page.

Referring back to FIG. 7C, then in a step 752 an error message is presented via device.

As a non-limiting example, error message is presented by device 106 (FIG. 1) using GUI 134 (FIG. 1).

Referring back to FIG. 7C, then in a step 754, execution of method 700 terminates.

Referring back to FIG. 7C, for a determination in step 746 for location allowed or for a determination in step 732 (FIG. 7B) for not performing geo-location, then in a step 756 web-service requests from database server transaction information associated with transaction identifier.

As a non-limiting example, web-service 122 (FIG. 1) requests transaction detail information from database server 116 (FIG. 1) as indicated by the transaction identifier.

Referring back to FIG. 7C, then in a step 758 database server receives request.

As a non-limiting example, database server 116 (FIG. 1) receives request.

Referring back to FIG. 7C, then in a step 760 database server transmits transaction information to web-service.

As a non-limiting example, database server 116 (FIG. 1) transmits transaction information to web-service 122 (FIG. 1).

Referring back to FIG. 7C, then in a step 762 web-service transmits information to device.

As a non-limiting example, web-service 122 (FIG. 1) transmits information to device 106 (FIG. 1).

Referring back to FIG. 7C, then in a step 764 device presents information for viewing.

As a non-limiting example, device 106 (FIG. 1) presents information for viewing to user 130 (FIG. 1) via GUI 134 (FIG. 1).

Referring back to FIG. 7C, then in a step 766, user, using device, authorizes or rejects transaction.

As a non-limiting example, using device 106 (FIG. 1), user 130 (FIG. 1) authorizes or rejects transaction.

Referring back to FIG. 7C, then in a step 768 device transmits selection to web-service.

As a non-limiting example, device 106 (FIG. 1) transmits selection information to web-service 122 (FIG. 1).

Referring back to FIG. 7C, then in a step 770 web-service transmits transaction information and selection information to web-server.

As a non-limiting example, web-service 122 (FIG. 1) transmits transaction identification information and selection information to web-server 118 (FIG. 1).

Referring back to FIG. 7C, then in a step 772 web-server redirects session.

As a non-limiting example, web-server 118 (FIG. 1) redirects session associated with transaction identifier to the response page. Furthermore, response page may indicate rejection or authorization.

Referring back to FIG. 7C, then in a step 774 browser associated with computer is redirected to response page.

As a non-limiting example, browser associated with computing device 108 (FIG. 1) is redirected to response page.

Referring back to FIG. 7C, then in a step 776 web-server processes the transaction if authorized or rejects transaction is not authorized.

As a non-limiting example, web-server 118 (FIG. 1) processes the transaction if authorized by user 130 (FIG. 1) or rejects transaction if not authorized by user 130 (FIG. 1).

Referring back to FIG. 7C, then in a step 778 execution of method 700 terminates.

FIGS. 7A-C illustrate an example method for performing a signed transaction as described with reference to FIG. 1 for performing secure operation.

A system has been described for performing secure authentication and transaction signing. System replaces passwords with a visual code. Visual code includes information for performing secure operations. Image of visual code may be captured for scanning and decoding. Initially a user pairs an associated device with a web-service and for visits following the initial visit, user accesses web-services by scanning visual code and selecting to access account. System includes a device with applications for capturing and decoding an image of visual code. Non-limiting examples for device include smartphone, cellular phone and personal computer. Device communicates bi-directionally with other devices via a global communication network. Device provides capability for receiving information from a user. Non-limiting examples of components for receiving information from a user include touch screen, keyboard, buttons and stylus. Web-service provides software for processing and communicating with device. Web-service provides capability for validating identity. Non-limiting examples for identity validation include commercial Public Key Infrastructure (PKI) providers. Web-service provides capability to perform certificate authority. Non-limiting examples for performing certificate authority include issuing and validating client certificates. Web-service provides capability to validate a user based upon a set of information. Non-limiting examples of information include prior user identification/password and account number. Web-service provides capability to perform redirection to secure operational areas. Web-service provides capability to present a visual code such that device may capture, scan and decode. For transaction verification, web-service performs redirection for validating a transaction and for presenting a visual code. System provides capability to perform processing based upon a user's geo-location.

Figure 8:
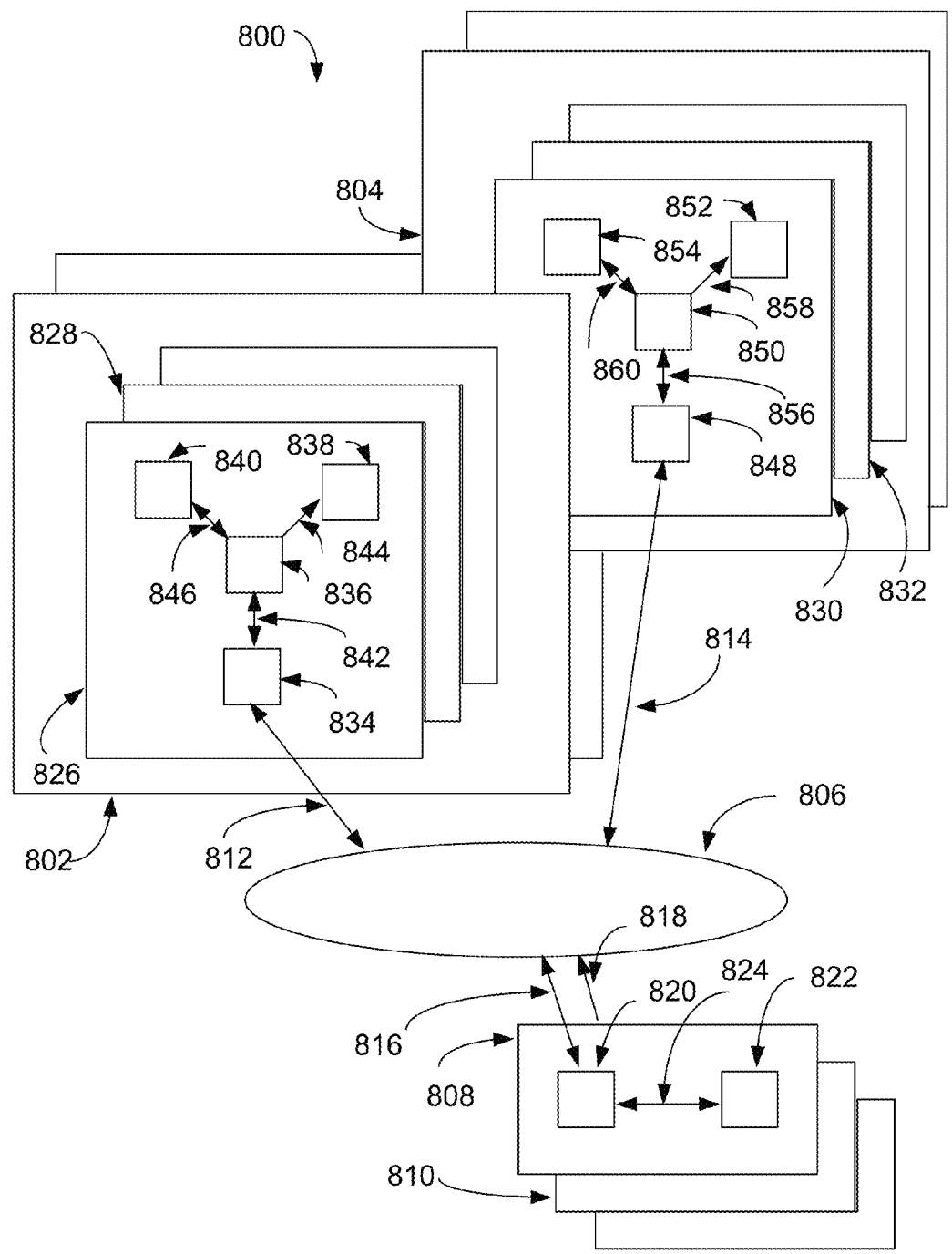
FIG. 8 illustrates a block diagram depicting a conventional client/server communication system.

FIG. 8 illustrates a block diagram depicting a conventional client/server communication system.

A communication system 800 includes a multiplicity of networked regions with a sampling of regions denoted as a network region 802 and a network region 804, a global network 806 and a multiplicity of servers with a sampling of servers denoted as a server device 808 and a server device 810.

Network region 802 and network region 804 may operate to represent a network contained within a geographical area or region. Non-limiting examples of representations for the geographical areas for the networked regions may include postal zip codes, telephone area codes, states, counties, cities and countries. Elements within network region 802 and 804 may operate to communicate with external elements within other networked regions or within elements contained within the same network region.

In some implementations, global network 806 may operate as the Internet. It will be understood by those skilled in the art that communication system 800 may take many different forms. Non-limiting examples of forms for communication system 800 include local area networks (LANs), wide area networks (WANs), wired telephone networks, cellular telephone networks or any other network supporting data communication between respective entities via hardwired or wireless communication networks. Global network 806 may operate to transfer information between the various networked elements.

Server device 808 and server device 810 may operate to execute software instructions, store information, support database operations and communicate with other networked elements. Non-limiting examples of software and scripting languages which may be executed on server device 808 and server device 810 include C, C++, C# and Java.

Network region 802 may operate to communicate bi-directionally with global network 806 via a communication channel 812. Network region 804 may operate to communicate bi-directionally with global network 806 via a communication channel 814. Server device 808 may operate to communicate bi-directionally with global network 806 via a communication channel 816. Server device 810 may operate to communicate bi-directionally with global network 806 via a communication channel 818. Network region 802 and 804, global network 806 and server devices 808 and 810 may operate to communicate bi-directionally and also communicate bi-directionally with other networked device located within communication system 800.

Server device 808 includes a networking device 820 and a server 822. Networking device 820 may operate to communicate bi-directionally with global network 806 via communication channel 816 and with server 822 via a communication channel 824. Server 822 may operate to execute software instructions and store information.

Network region 802 includes a multiplicity of clients with a sampling denoted as a client 826 and a client 828. Client 826 includes a networking device 834, a processor 836, a GUI 838 and an interface device 840. Non-limiting examples of devices for GUI 838 include monitors, televisions, cellular telephones, smartphones and PDAs (Personal Digital Assistants). Non-limiting examples of interface device 840 include pointing device, mouse, trackball, scanner and printer. Networking device 834 may communicate bi-directionally with global network 806 via communication channel 812 and with processor 836 via a communication channel 842. GUI 838 may receive information from processor 836 via a communication channel 844 for presentation to a user for viewing. Interface device 840 may operate to send control information to processor 836 and to receive information from processor 836 via a communication channel 846. Network region 804 includes a multiplicity of clients with a sampling denoted as a client 830 and a client 832. Client 830 includes a networking device 848, a processor 850, a GUI 852 and an interface device 854. Non-limiting examples of devices for GUI 838 include monitors, televisions, cellular telephones, smartphones and PDAs (Personal Digital Assistants). Non-limiting examples of interface device 840 include pointing devices, mousse, trackballs, scanners and printers. Networking device 848 may communicate bi-directionally with global network 806 via communication channel 814 and with processor 850 via a communication channel 856. GUI 852 may receive information from processor 850 via a communication channel 858 for presentation to a user for viewing. Interface device 854 may operate to send control information to processor 850 and to receive information from processor 850 via a communication channel 860.

For example, consider the case where a user interfacing with client 826 may want to execute a networked application. A user may enter the IP (Internet Protocol) address for the networked application using interface device 840. The IP address information may be communicated to processor 836 via communication channel 846. Processor 836 may then communicate the IP address information to networking device 834 via communication channel 842. Networking device 834 may then communicate the IP address information to global network 806 via communication channel 812. Global network 806 may then communicate the IP address information to networking device 820 of server device 808 via communication channel 816. Networking device 820 may then communicate the IP address information to server 822 via communication channel 824. Server 822 may receive the IP address information and after processing the IP address information may communicate return information to networking device 820 via communication channel 824. Networking device 820 may communicate the return information to global network 806 via communication channel 816. Global network 806 may communicate the return information to networking device 834 via communication channel 812. Networking device 834 may communicate the return information to processor 836 via communication channel 842. Processor 836 may communicate the return information to GUI 838 via communication channel 844. User may then view the return information on GUI 838.

Figure 9:
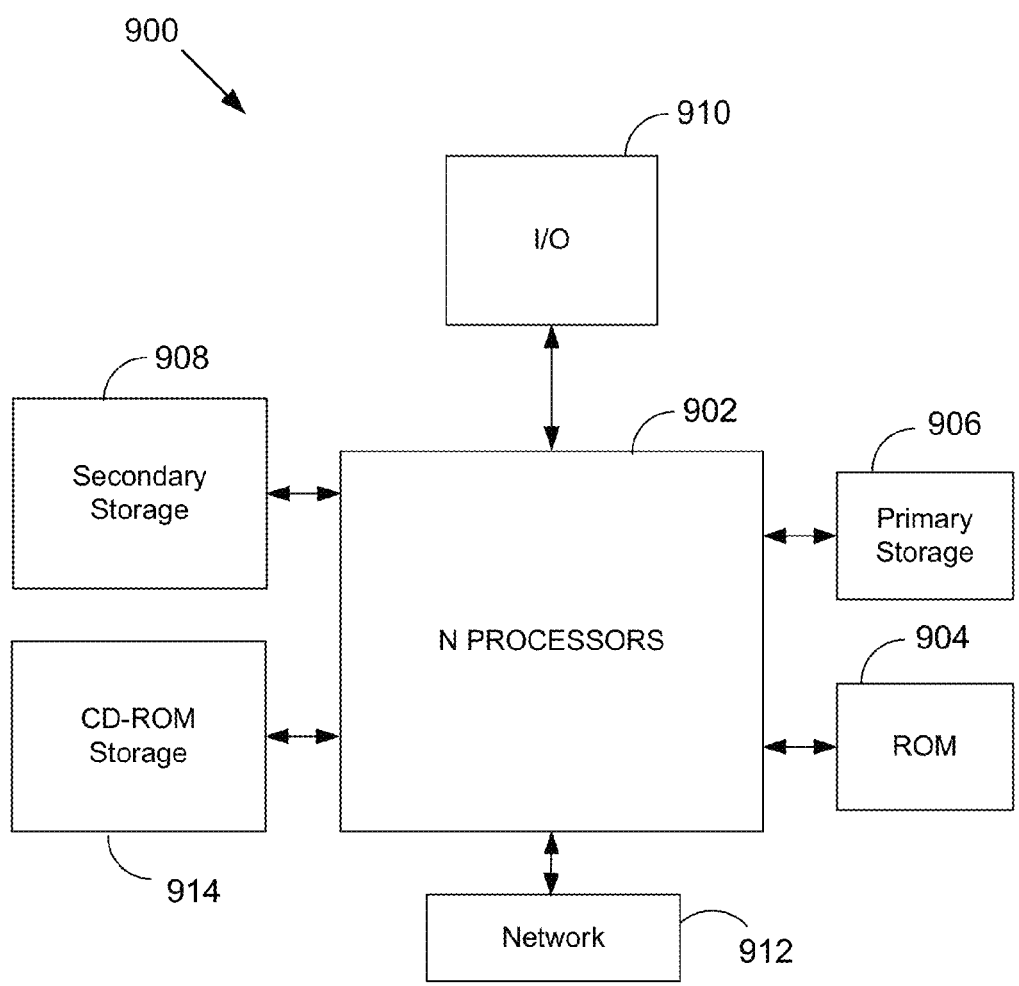
FIG. 9 illustrates a typical computer system that, when appropriately configured or designed, may serve as a computer system for which the present invention may be embodied.

FIG. 9 illustrates a typical computer system that, when appropriately configured or designed, may serve as a computer system 900 for which the present invention may be embodied.

Computer system 900 includes a quantity of processors 902 (also referred to as central processing units, or CPUs) that may be coupled to storage devices including a primary storage 906 (typically a random access memory, or RAM), a primary storage 904 (typically a read-only memory, or ROM). CPU 902 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 904 acts to transfer data and instructions uni-directionally to the CPU and primary storage 906 typically may be used to transfer data and instructions in a bi-directional manner. The primary storage devices discussed previously may include any suitable computer-readable media such as those described above. A mass storage device 908 may also be coupled bi-directionally to CPU 902 and provides additional data storage capacity and may include any of the computer-readable media described above. Mass storage device 908 may be used to store programs, data and the like and typically may be used as a secondary storage medium such as a hard disk. It will be appreciated that the information retained within mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 may also be coupled to an interface 910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to an external device such as a database or a computer or telecommunications or internet network using an external connection shown generally as a network 912, which may be implemented as a hardwired or wireless communications link using suitable conventional technologies. With such a connection, the CPU might receive information from the network, or might output information to the network in the course of performing the method steps described in the teachings of the present invention.

In another alternate embodiment, the pairing of the device to the website may occur upon scanning the QR code for the first time. The QR code would contain the url and session identifier. The device would navigate to the url and start the pairing process. The rest of the invention would work as stated above.

In another alternate embodiment, the web-service and certificate service is eliminated and its functionality is merged into the web server.

In another alternate embodiment, the certificates are replaced with a one-time password system. Upon device pairing the seed value that generates the changing one time password would be exchanged. Future logins would simply have the web service request the current one-time password, the web service, having possession of the seed value, would be able to validate the token.

In another alternate embodiment, the database server simply stores the certificate to the account pairing information. The other data is not committed to the database but simply passed between the various functions using the existing network.

In another alternate embodiment, this invention may be used to authorize anyone to anything via an alternative communication channel. In a non-limiting example, a door may have an electronic lock. Next to it may be placed a small LCD screen that rotates QR codes. Upon scanning the QR code by a valid enrolled device, the electronic lock could be opened. Another non-limiting example would be to gain access to a computer or an application running on a computer. A QR code may be presented and may be scanned by an enrolled device. Upon verification, the application or workstation would grant access.

In another alternate embodiment, the certificate authority may be located on the device rather than at each web site. This variation would work similarly to the embodiment described within this document however the device during pairing would issue a certificate to the web service, which would be stored as described in the original embodiment. For validation, once the visual code is scanned, the device communicates with the web-service. Upon validating the SSL certificate of the web-service, the device would request the certificate for the device. The web-service would then look it up and send it to the device for verification. Upon the device verifying this certificate, authentication would complete.

In another alternate embodiment, a user may go to a web site and fill out an application for an account. A QR code may then be issued via mail. Upon a properly configured device scanning the QR code, the pairing process at both the device and account level may occur. The QR code would contain a nonce that linked back to the application. Upon the device navigating to the url contained in the QR code and passing the nonce, the linking may occur in one step.

In another alternate embodiment, the device after scanning the QR code, may upon request of the web-service may pass additional information back to the web-service for processing, and ultimately for granting access. This may include, but not be limited to, unique device identifiers such as UDID, IMEI and IMSI (smart phones). It may also request the user look into the camera on the device, where a picture of the user may be taken and uploaded to the web-service for additional authentication (for use in facial recognition of the user).

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: servers and global communication network.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of a secure authentication system according to the present invention will be apparent to those skilled in the art. The invention has been described above by way of illustration, and the specific embodiments disclosed are not intended to limit the invention to the particular forms disclosed. For example, the particular implementation of the devices used for scanning symbols may vary depending upon the particular type of device used. The devices described in the foregoing were directed to smartphone implementations; however, similar techniques using cellular telephone implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method comprising the steps of:
   establishing a communication with a computing system, said establishing comprising using a first device being configured to be operable for communicating with said computing system over a first communication channel, said computing system being in communication with a second device being configured to be operable for communicating with said computing system over a second communication channel being separate from said first communication channel;

pairing said first device with said computing system in which said first device and said computer system are mutually authenticated, in which said pairing step comprising the steps of;

selecting an application associated with said first device, said application being operable to perform a pairing operation;

configuring said application for a pairing mode with a menu selection;

providing an associated address of said computing system seeking to perform said pairing with said first device, said associated address being configured to specify a service operation of said application;

receiving and decoding said associated address by said first device;

navigating to said service operation specified in said associated address, said service being provided by said computing system; and validating a secure socket layer (SSL) certificate, said validating step is configured to ensure that said first device is paired with a correct computing system;

capturing a code being presented by said second device, said capturing comprising using said first device; and communicating said code to said computing system over said first communication channel in which said computer system authorizes said second device to perform a function, said computer system communicating an authorization to said second device using said second communication channel.

2. The method as recited in claim 1, further comprising the step of presenting an image of a symbol via a graphical user interface (GUI), in which said computing system comprises at least a web site, wherein a camera of said first device captures said image of said symbol.

3. The method as recited in claim 2, in which said web site at least comprises a web-service, wherein said symbol is encoded and said symbol represents information associated with a Uniform Resource Locator (URL) and a transaction identifier.

4. The method as recited in claim 3, in which said first device receives a client certificate from said web-service during said pairing, and in which said symbol comprising a nonce, wherein said symbol further comprising a transaction identifier for a transaction authentication and a session identifier for login.

5. The method as recited in claim 4, in which said first device uses at least said code for navigating to a secure portion of said web site to communicate said code along with said client certificate to said web-service.

6. The method as recited in claim 3, in which said authorization comprises a redirection of said second device to a secure portion of said web site.

7. The method as recited in claim 3, further comprising the step of pairing said first device with at least an account associated with said web site.

8. The method as recited in claim 7, said function at least comprises a transaction for said account.

9. The method as recited in claim 3, further comprising the step of communicating a geo-location of said first device to said web-service during said in which a proximity of said first device to said second device in part determines said authentication.

10. A system consisting of:
a computing system;
a first communication channel;
a second communication channel;
a first device being configured to be operable for communicating with said computing system over said first communication channel, said first device being paired with said computer system in which said first device and said computer system are configured to be mutually authenticated, said first device being further configured to be operable for capturing a code and for communicating said code to said computing system over said first communication channel in which said computer system executes an authorization;
an associated address, said associated address being configured to specify a service operation performed by said first device, wherein said associated address is provided to said first device during said first device being paired with said computer system;
a secure socket layer (SSL) certificate, said certificate is validated by said computing system, wherein said certificate is configured to assure that said first device is paired with a correct computing system, thereby said first device and said computer system are mutually authenticated;
a second device being configured to be operable for communicating with said computing system over said second communication channel being separate from said first communication channel, said second device being further configured to be operable for presenting said code for capture by said first device and for receiving said authorization from said computer system to perform a function; and
in which said computing system comprises at least a web site comprising a web-service, said first device communicates a geo-location of said first device to said web-service during said being paired in which a proximity of said first device to said second device at least in part determines said authentication, said first device receives a client certificate from said web-service during said being paired with said web site, said first device being further paired with at least an account associated with said web site, said code being encrypted within a multi-dimensional symbol being displayed by said second device, said first device uses at least said code for navigating to a secure portion of said web site to communicate said code along with said client certificate to said web-service, said authorization comprising at least a redirection of said second device to a secure portion of said web site in which said function at least comprises a transaction for said account.

11. A non-transitory computer-readable storage medium with an executable program stored thereon, wherein the program instructs a processor to perform the following steps:

establishing a communication with a computing system, said establishing comprising using a first device being configured to be operable for communicating with said computing system over a first communication channel, said computing system being in communication with a second device being configured to be operable for communicating with said computing system over a second communication channel being separate from said first communication channel;

pairing said first device with said computer system in which said first device and said computer system are mutually authenticated, in which said pairing step comprising the steps of:
selecting an application associated with said first device, said application being operable to perform a pairing operation;
configuring said application for a pairing mode with a menu selection;
providing an associated address of said computing system seeking to perform said pairing with said first device, said associated address being configured to specify a service operation of said application;
receiving and decoding said associated address by said first device;
navigating to said service operation specified in said associated address, said service being provided by said computing system; and
validating a secure socket layer (SSL) certificate, said validating step is configured to ensure that said first device is paired with a correct computing system;
capturing a code being presented by said second device, said capturing comprising using said first device; and
communicating said code to said computing system over said first communication channel in which said computer system authorizes said second device to perform a function, said computer system communicating an authorization to said second device using said second communication channel.

12. The program instructing the processor as recited in claim 11, in which said computing system comprises at least a web site.

13. The program instructing the processor as recited in claim 12, in which said web site at least comprises a web-service.

14. The program instructing the processor as recited in claim 13, in which said first device receives a client certificate from said web-service during said pairing.

15. The program instructing the processor as recited in claim 14, in which said first device uses at least said code for navigating to a secure portion of said web site to communicate said code along with said client certificate to said web-service.

16. The program instructing the processor as recited in claim 13, in which said authorization comprises a redirection of said second device to a secure portion of said web site.

17. The program instructing the processor as recited in claim 13, further comprising the step of pairing said first device with at least an account associated with said web site.

18. The program instructing the processor as recited in claim 17, said function at least comprises a transaction for said account.

19. The program instructing the processor as recited in claim 13, further comprising the step of communicating a geo-location of said first device to said web-service during said pairing in which a proximity of said first device to said second device in part determines said authentication.

* * * * *